US011735833B2

(12) United States Patent
Wang et al.

(10) Patent No.: US 11,735,833 B2
(45) Date of Patent: Aug. 22, 2023

(54) TRANSCEIVER CIRCUIT WITH POLARIZATION SELECTION

(71) Applicant: Apple Inc., Cupertino, CA (US)

(72) Inventors: Hongrui Wang, San Diego, CA (US); Sohrab Emami-Neyestanak, San Diego, CA (US)

(73) Assignee: Apple Inc., Cupertino, CA (US)

( * ) Notice: Subject to any disclaimer, the term of this patent is extended or adjusted under 35 U.S.C. 154(b) by 627 days.

(21) Appl. No.: 16/585,223

(22) Filed: Sep. 27, 2019

(65) Prior Publication Data
US 2021/0098896 A1 Apr. 1, 2021

(51) Int. Cl.
| | |
|---|---|
| *H01Q 21/24* | (2006.01) |
| *H01Q 25/00* | (2006.01) |
| *H01Q 21/28* | (2006.01) |
| *H04B 7/10* | (2017.01) |
| *H01Q 3/26* | (2006.01) |
| *G01S 7/02* | (2006.01) |

(52) U.S. Cl.
CPC ......... *H01Q 21/245* (2013.01); *G01S 7/024* (2013.01); *H01Q 3/26* (2013.01); *H01Q 21/28* (2013.01); *H01Q 25/001* (2013.01); *H04B 7/10* (2013.01)

(58) Field of Classification Search
CPC ........ H01Q 21/245; H01Q 3/26; H01Q 21/28; H01Q 25/001; G01S 7/024; H04B 7/10
See application file for complete search history.

(56) References Cited

U.S. PATENT DOCUMENTS

| | | | |
|---|---|---|---|
| 5,068,668 A | 11/1991 | Tsuda et al. | |
| 9,571,183 B2 | 2/2017 | Runyon et al. | |
| 9,780,437 B2 | 10/2017 | Knox | |
| 10,971,815 B1* | 4/2021 | West | H01Q 21/24 |
| 2014/0253378 A1* | 9/2014 | Hinman | H01Q 21/28 |
| | | | 342/361 |
| 2018/0131350 A1* | 5/2018 | Shimura | H03H 11/16 |
| 2019/0081596 A1* | 3/2019 | Dunworth | H01Q 1/2283 |
| 2019/0089070 A1* | 3/2019 | Zihir | H01Q 21/067 |
| 2019/0363453 A1* | 11/2019 | Yu | H04B 7/0413 |
| 2019/0386397 A1* | 12/2019 | Son | H01Q 21/061 |
| 2021/0344124 A1* | 11/2021 | Motoi | H01Q 21/24 |

* cited by examiner

*Primary Examiner* — Peter M Bythrow
*Assistant Examiner* — Nazra Nur Waheed
(74) *Attorney, Agent, or Firm* — Kowert, Hood, Munyon, Rankin & Goetzel, P.C.; Dean M. Munyon

(57) ABSTRACT

A transceiver circuit that includes multi-port antenna and transmitter and receiver circuit may transmit and receive polarized electromagnetic waves. The polarization of transmitted electromagnetic waves may be determined by adjusting gain and phase differences between multiple circuit paths in the transmitter circuit. In a similar fashion, the gain and phase of circuit paths in the receiver circuit may be adjusted to accommodate different polarizations of received electromagnetic waves.

18 Claims, 18 Drawing Sheets

US 11,735,833 B2

TRANSCEIVER CIRCUIT WITH POLARIZATION SELECTION

BACKGROUND

Technical Field

This disclosure relates to transceiver circuits in computer systems and more particularly to transmitting and receiving polarized signals.

Description of the Related Art

During operation, a computer system may communicate with other computer systems. The computer system may send text or electronic mail messages to a communication server for routing to the messages respective destinations. In some cases, the computer system may access data on a disk or storage server. Such data may be stored on the disk or storage server due the amount of data being stored, or to allow multiple computer systems to have access to the data.

Communication between computer systems may be accomplished in a variety of methods. In some cases, the different computer systems may be coupled together using cables through which data is transmitted as a series of electronic signals. Such cables may include metallic conductors that are used as a medium through which the electronic signals are propagated. In other cases, the different computer systems may be coupled using optical cables through which data is transmitted as a series of light signals.

In addition to the use of cables through which signals are transmitted between computer systems, signals may also be transmitted between computer signals using one of various radio techniques, Wi-Fi, for example. In such cases, a computer system converts data into a signal which is transmitted to other computer systems using electromagnetic waves. A receiving computer system uses an antenna to convert the electromagnetic waves into an electronic signal from which the data can be extracted.

SUMMARY OF THE EMBODIMENTS

Various embodiments of a receiver circuit are disclosed. Broadly speaking, a receiver circuit may include an antenna unit that includes first and second ports, and may be configured to receive information encoded in polarized electromagnetic waves and generate first and second received signals on the first and second ports, respectively, using the polarized electromagnetic waves. First and second circuit paths included in a receive circuit may be configured to generate first and second amplified signals using the first and second received signals, respectively, and first and second phase shifts, respectively. The receiver circuit may be configured to generate an output signal using the first and second amplified signals. In a different embodiment, the antenna unit may include first and second antennas, where the second antenna has a different orientation than that of the first antenna.

Figure 1:
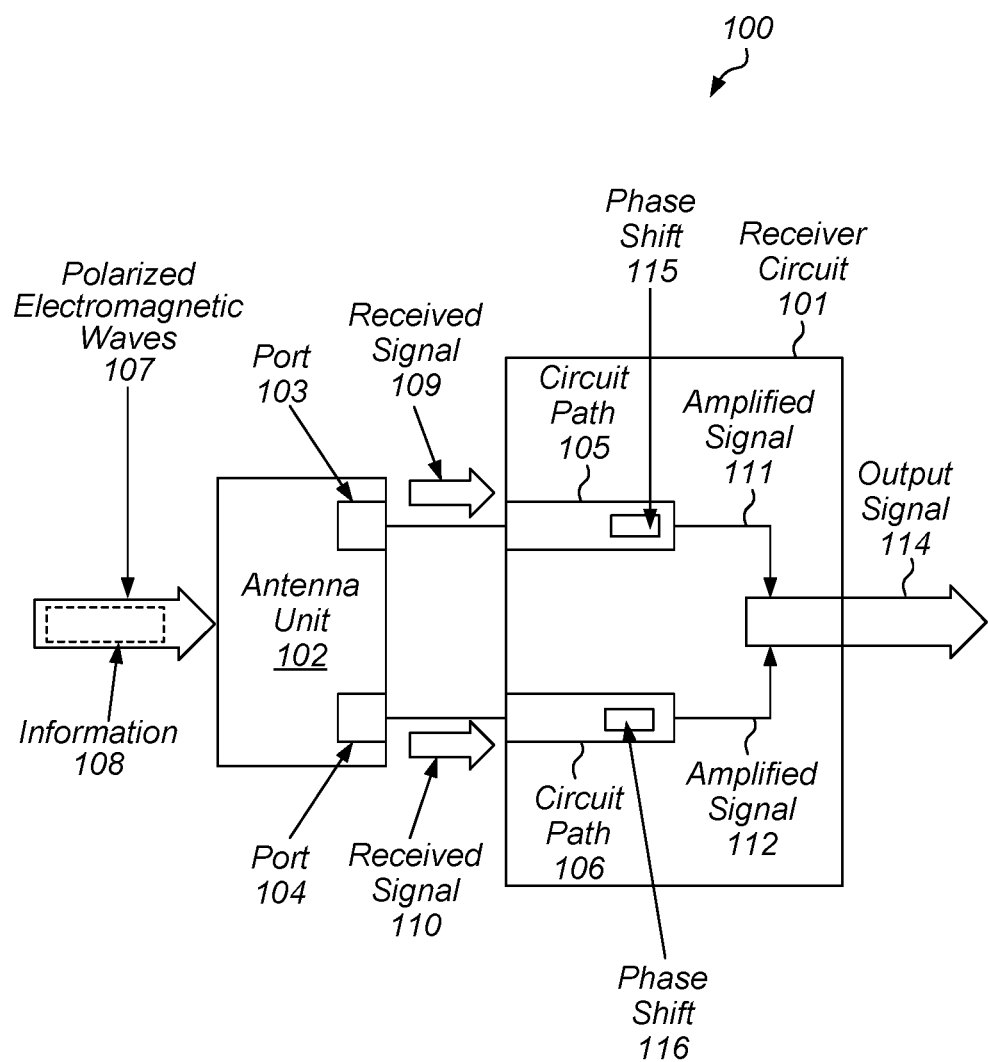
FIG. 1 is a block diagram of an embodiment of a transceiver circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Many computer systems come equipped with various receiver circuits that allow the computer system to receive signals encoded in electromagnetic waves. Such signals may be received as part of communication over a wireless network, e.g., Wi-Fi, while other signals may be received in response to transmissions generated by a sensor circuit included in a computer system. Such sensors may be used to determine a distance to particular object. For example, sensors may be employed by a mobile computer system to determine a distance to a desktop computer system, router, etc.

When signals are transmitted from one computer system to another, an antenna may be employed to convert a radio frequency current into electromagnetic waves, which radiate away from the antenna. Often, such electromagnetic waves are polarized. As used herein, polarization of electromagnetic waves (or simply "polarization") refers to property associated with transverse electromagnetic waves that specifies a geometrical orientation of the oscillations. For example, electromagnetic waves may be polarized linearly, circularly, or elliptically. To minimize signal loss, an antenna receiving polarized electromagnetic waves should be arranged to match the polarization of the electromagnetic waves. When the receiving antenna does not match the polarization of the electromagnetic waves, signal loss and degradation may occur.

To allow for different polarizations, some computer systems employ duplicate receiver circuits, each coupled to respective antenna oriented for a particular polarization. Using duplicate circuits, however, may result in a large circuit and increased power consumption. Other computer systems may employ a dual-polarized antenna in conjunction with a double pole double throw switch coupled to transmitter and receiver circuits. Such switches, however, can attenuate the signal generated by the antenna, decreasing the effectiveness of the circuit. Additionally, only one antenna orientation of the dual-polarized antenna may be used at a single time, which still allows for loss for certain polarizations. The embodiments illustrated in the drawings and described below may provide techniques for transmitting, receiving or rejecting a particular polarized electromagnetic wave, with minimal increases in circuit area and power consumption.

A block diagram of a transceiver circuit is depicted in FIG. 1. As illustrated, transceiver circuit 100 includes antenna unit 102, and receiver circuit 101. Antenna unit 102 includes ports 103 and 104, and receiver circuit 101 includes circuit paths 105 and 106.

Antenna unit 102 is configured to receive electromagnetic waves 107. As depicted, information 108 is encoded in polarized electromagnetic waves 107. Antenna unit 102 is further configured to generate, using polarized electromagnetic waves 107, received signal 109 on port 103 and received signal 110 on port 104. As described below in more detail, each of ports 103 and 104 may be coupled to respective ones of multiple antennas, where different ones of the multiple antennas have different orientations. It is noted that although antenna unit 102 is depicted as including two ports, in other embodiments, antenna unit 102 may include more than two ports.

Circuit path 105 is configured to generate amplified signal 111 using received signal 109 and phase shift 115, and circuit path 106 is configured to generate amplified signal 112 using received signal 110 and phase shift 116. In various embodiments, phase shift 115 and phase shift 116 may be based, at least in part, on a determination of how polarized waves 107 were polarized. For example, if polarized waves 107 were polarized using circuit polarization, then phase shifts 115 and 116 may be set to a particular set of values. Other varieties of polarization, e.g., elliptical, may result in phase shifts 115 and 116 being set to different values. As described below in more detail, the values for phase shifts 115 and 116 may be stored as configuration data in a register or other suitable circuit. As noted above, antenna unit 102 may include more than two ports. In such cases, receiver circuit 101 may include more than two circuit paths coupled to respective one of ports included in antenna unit 102. As used herein, phase difference refers to a difference in time between two signals of a common frequency.

Receiver circuit 101 is configured to generate output signal 114 using amplified signal 111 and amplified signal 112. By using both amplified signals 111 and 112, the reception of polarized electromagnetic waves 107 may be improved while minimizing an impact on circuit area and power consumption. In various embodiments, information 108 encoded in electromagnetic waves 107 may be similarly encoded in output signal 114. As described below in more detail, receiver circuit 101 may employ any suitable combination of combiner and phase shifter circuits configured to combine amplified signal 111 and amplified signal 112 to generate output signal 114

Figure 18:
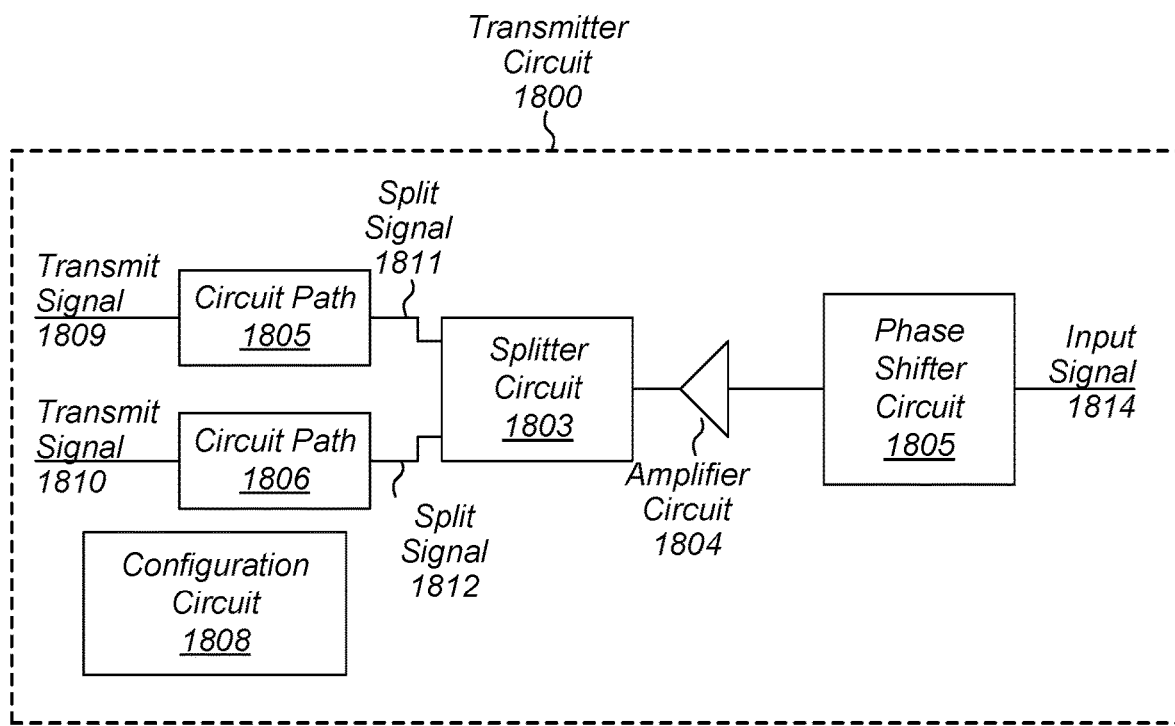
FIG. 18 is a block diagram of a transmitter circuit.

It is noted that receiver circuit 101 can be reconfigured to be used as a transmitter circuit. By reversing the direction of signal flows within receiver circuit 101, two transmit signals may be generated for driving antenna unit 102, in order to create different types of electromagnetic wave polarization. An example of a transmitter circuit is depicted in FIG. 18. As illustrated, transmitter circuit 1800 includes phase shifter circuit 1805, amplifier circuit 1804, splitter circuit 1803, circuit paths 1805 and 1806, and configuration circuit 1808. Input signal 1814 is input to phase circuit 1805, whose output is amplified by amplifier circuit 1804. Splitter circuit 1803 generates split signals 1811 and 1812 using the output of amplifier circuit 1804. Circuit paths 1805 and 1806, which operate in a similar fashion to circuit paths 105 and 106 but with the opposite direction of signal flow, generate transmit signals 1809 and 1810. Information stored in configuration circuit 1808 sets respective gains and phase shifts for circuit paths 1805 and 1806, thereby determining the polarization of transmitted electromagnetic waves generated using transmit signals 1809 and 1810.

Figure 2:
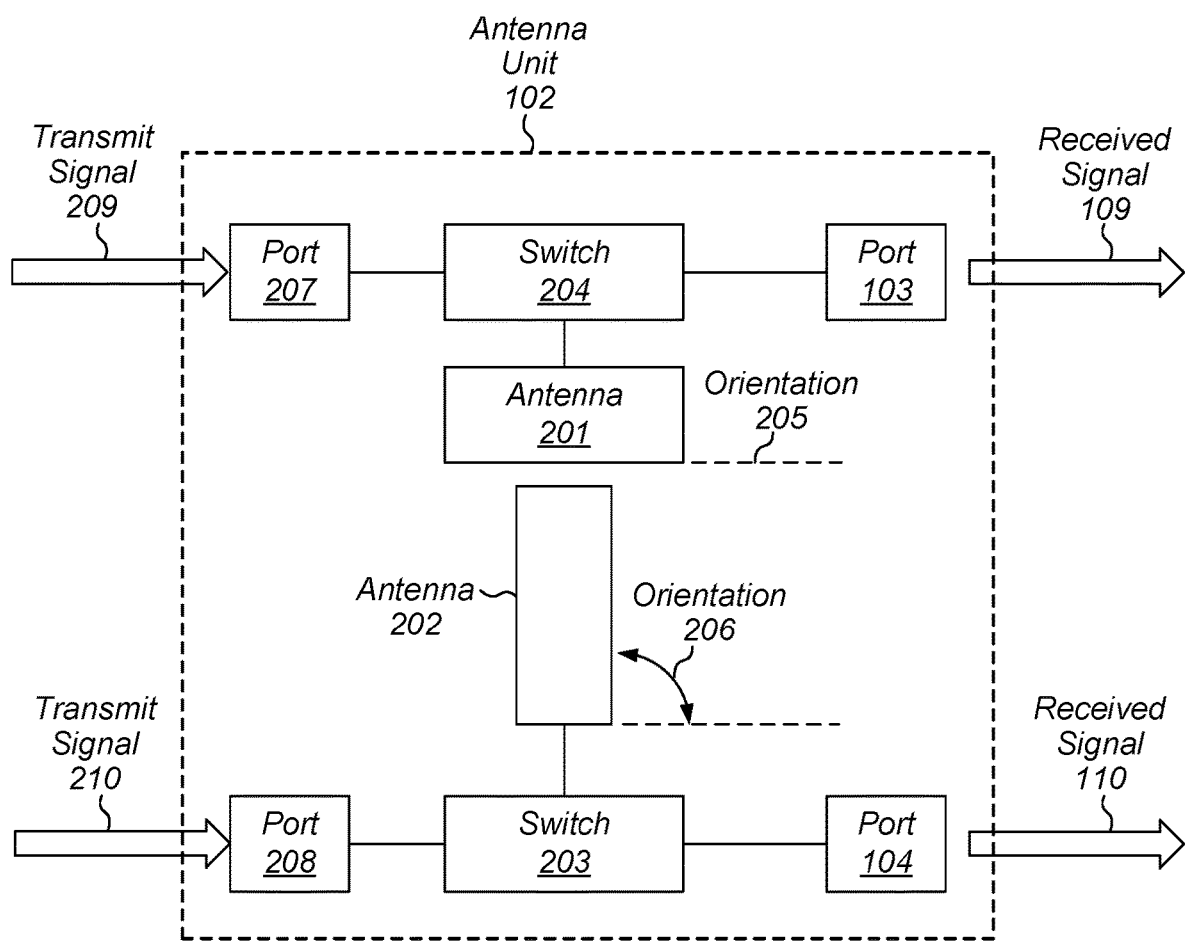
FIG. 2 illustrates a block diagram of an embodiment of an antenna unit.

Turning to FIG. 2, a block diagram illustrating an embodiment of antenna unit 102 is depicted. As illustrated, antenna unit 102 includes antennas 201 and 202, ports 103, 104, 207, and 208, and switches 203 and 204.

Switches 203 and 204 may be particular embodiments of transmit/receive (TR) switches that are configured to couple either a receiver circuit, e.g., receiver circuit 101, or a transmitter circuit to antennas 201 and 202 via ports 103, 104, 207, and 208. For example, switch 203 is configured to selectively couple a transmitter circuit coupled to port 208 or a receiver circuit coupled to port 104 to antenna 202.

Antennas 201 and 202 may be fabricated as wires, coils, or other suitable metal structures suitable for transmitting and receiving electromagnetic waves, and may be differently oriented. In some cases, respective orientations of antennas 201 and 202 may be specified in relation to a reference plane or direction. For example, as illustrated, respective orientations of antennas 201 and 202 are referenced to a horizontal line. An orientation of antenna 201 is 0° relative to the reference line, and an orientation of antenna 202 is 90° relative to the reference line.

When used to receive, switches 204 and 203 couple antennas 201 and 202 to ports 103 and 104, respectively. Electromagnetic waves induce currents in antennas 201 and 202. The currents are then routed through ports 103 and 104 to generate received signals 109 and 110. Based on a polarization of the electromagnetic waves different levels of current will be introduced in antennas 201 and 202. For example, vertically polarized electromagnetic waves may introduce a larger current in antenna 202 than in antenna 201 as the orientation of antenna 202 matches the polarization.

When the polarization of the received electromagnetic waves does not match either of the orientations of the antennas, a respective current is antenna is induced in each of the antennas. Since the orientation of the antenna does match the polarization of the electromagnetic waves, the induced currents will be less than in cases where the orientations and polarization match, thereby reducing the effectiveness of the antennas. By employing a receiver circuit, e.g., receiver circuit 101, that uses signals from both antennas to generate an output signal, the effectiveness of an antenna and receiver circuit combination may be improved.

During transmit operations, switches 204 and 203 couple antennas to ports 207 and 208, respectively. By coupling antenna 201 to port 207, and antenna 202 to port 208, transmit signal 209 is allowed to flow into antenna 201 and transmit signal 210 is allowed to flow into antenna 202. With transmit signals 209 and 210 flowing in antennas 201 and 202, respectively, each of antenna 201 and 202 generate electromagnetic waves.

Antenna 201 may generate electromagnetic waves that are horizontally polarized based on orientation 205, while antenna 202 may generate electromagnetic waves that are vertically polarized based on orientation 206. By adjusting a phase difference between transmit signal 209 and transmit signal 210, the superposition of the electromagnetic waves generated by antennas 201 and 202 may form other polarizations, e.g., circular.

Figure 3:
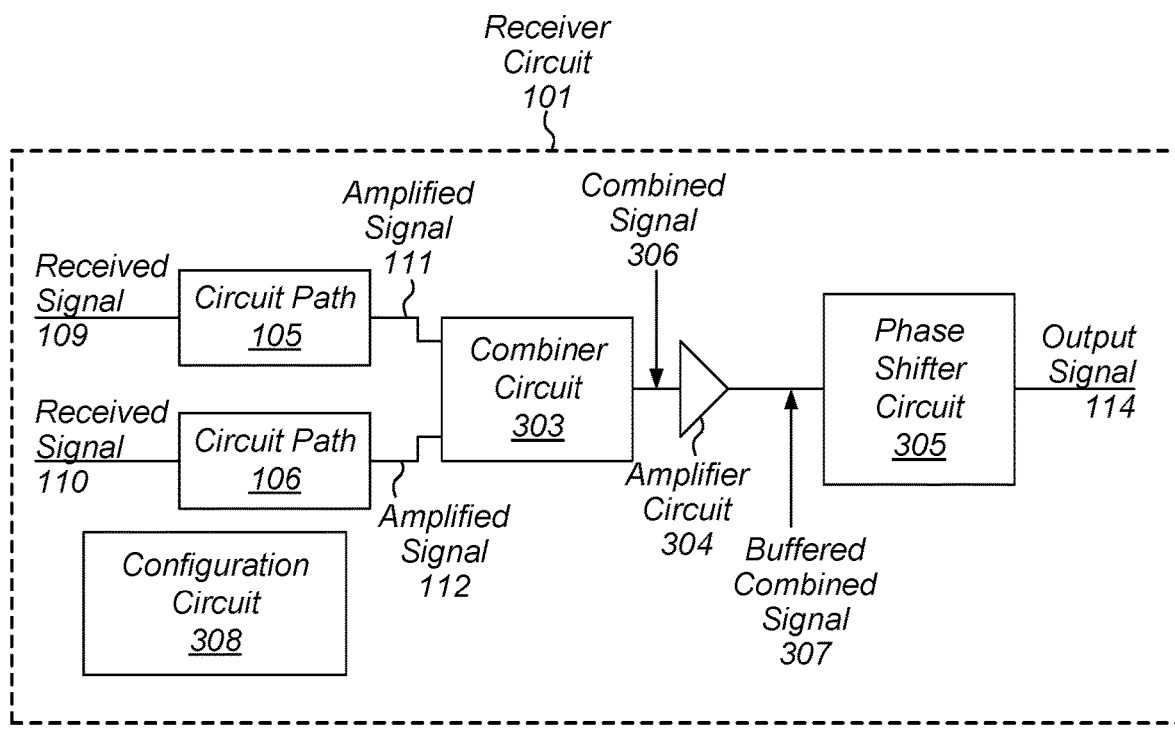
FIG. 3 illustrates a block diagram of a receiver circuit.

An embodiment of receiver circuit 101 is depicted in FIG. 3. As illustrated, receiver circuit 101 includes circuit paths 105 and 106, combiner circuit 303, amplifier circuit 304, phase shifter circuit 305, and configuration circuit 308.

Circuit path 105 is configured to generate amplified signal 111 using received signal 109, and circuit path 106 is configured to generate amplified signal 112 using received signal 110. As noted above, the phase difference between amplified signal 111 and amplified signal 112 may be based, at least in part, on the type of polarization used with polarized electromagnetic waves 107. To achieve the desired phase difference between amplified signals 111 and 112, circuit paths 105 and 106 may each employ different levels of amplification and phase shifting to generate their respective amplified signals.

As described below in more detail, both circuit path 105 and circuit path 106 may include various amplifier and phase shifting circuits. In some embodiments, circuit path 105 and circuit path 106 may be duplicate instances of the same base circuit, each employing different configuration settings. Data indicative of the different settings used by each of circuit paths 105 and 106 may, in some embodiments, be stored in configuration circuit 308.

Combiner circuit 303 may, in various embodiments, be a particular embodiment of a transformer circuit configured to combine amplified signal 111 and amplified signal 112 to generate combined signal 306. As described below in more detail, combiner circuit 303 may include a center-tapped transformer circuit element as well as any other suitable circuit elements.

Amplifier circuit 304 is configured to amplify combined signal 306 to generate buffered combined signal 307. In various embodiments, amplifier circuit 304 may be a particular embodiment of a unity gain amplifier circuit. Alternatively, in other embodiments, data indicative of settings within amplifier circuit 304 that determine a gain associated with amplifier circuit 304 may be stored in configuration circuit 308. Amplifier circuit 304 may, in some embodiments, include any suitable combination of active and passive circuit elements arranged to amplify a voltage or a current of combined signal 306 to generate buffered combined signal 307.

Phase shifter circuit 305 is configured to phase shift buffered combined signal 307 to generate output signal 114. As used herein, a phase shift refers to adjusting a time between two common points on an unshifted version of a signal and a phase-shifted version of the signal. As described below in more detail, phase shifter circuit 305 may be configured to provide either a 0° phase shift or a negative 45° phase shift. Data indicative of which phase shift to use in the generation of output signal 114 may be stored in configuration circuit 308. Phase shifter circuit 305 may, in various embodiments, include any suitable combination of passive or active circuit elements arranged to provide the desired phase shift.

As described below in more detail, different configurations may be evaluated to determine a particular configuration that provides a desired level of signal gain, a desired level of rejection of a particular polarization, and the like. In various embodiments, a given configuration may include data indicative of one or more position settings for switches included in circuit paths 105 and 106. Once the particular configuration has been determined, data associated with the particular configuration may be stored in configuration circuit 308. In various embodiments, configuration circuit 308 may include a static random-access memory (SRAM), multiple registers or latch circuits, or any other circuit suitable for storing the data associated with the selected configuration.

Figure 4:
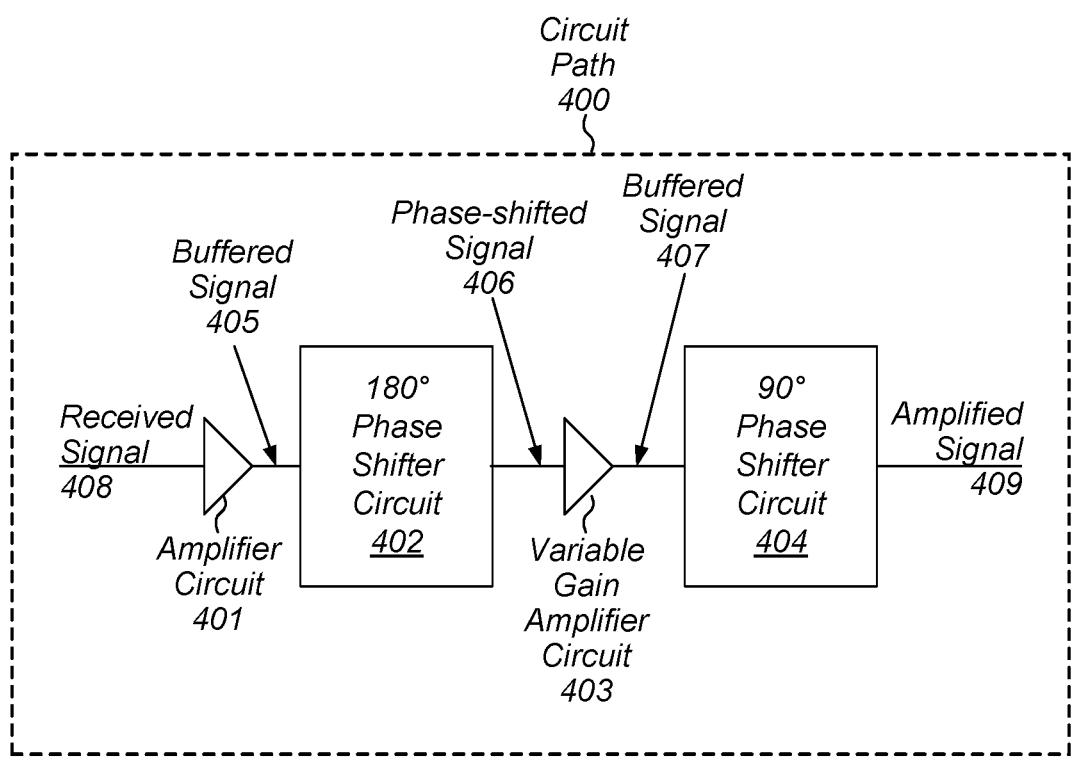
FIG. 4 illustrates a block diagram of a circuit path included in a receiver circuit.

As noted above, to allow for the different polarizations, each of circuit paths 105 and 106 may be separately adjusted to provide a particular phase difference between amplified signals 111 and 112. In various applications, circuit paths 105 and 106 may be different instances of a common circuit with respective configuration settings. An embodiment of such a configuration circuit path is depicted in FIG. 4. In various embodiments, circuit path 400 may correspond to either of circuit paths 105 or 106 as depicted in FIGS. 1 and 3. As illustrated, circuit path 400 includes amplifier circuit 401, 180° phase shifter circuit 402, variable gain amplifier circuit 403, and 90° phase shifter circuit 404.

Amplifier circuit 401 is coupled to an input of 180° phase shifter circuit, and is configured to amplify received signal 408 to generate buffered signal 405. In various embodiments, received signal 408 may correspond to either of received signal 109 or received signal 110. In various embodiments, amplifier circuit 401 may be a particular embodiment of an operational amplifier, or other suitable amplifier circuit. A gain value associated with amplifier circuit 401 may be fixed during design and may be trimmed during testing of a computer system or integrated circuit.

180° phase shifter circuit 402 is configured to generate phase-shifted signal 406 using buffered signal 405. In various embodiments, phase-shifted signal 406 and buffered signal 405 may have similar amplitudes, but phase-shifted signal 406 may lag, in time, buffered signal 405 by a particular phase angle, e.g., 180°. An amount of phase shift provided by 180° phase shifter circuit 402 may be based on configuration data stored in configuration circuit 308. As described below in more detail, 180° phase shifter circuit 402 may include a combination of passive circuit elements, such as switches and inductors.

Variable gain amplifier circuit 403 is configured to generate buffered signal 407 using phase-shifted signal 406. In various embodiments, an amplitude of buffered signal 407 may be greater than an amplitude of phase-shifted signal 406. The difference in amplitudes of buffered signal 407 and phase-shifted signal 406 may be based on a gain value associated with variable gain amplifier circuit 403. In some embodiments, the gain value associated with variable gain amplifier circuit 403 may be adjusted based on configuration data stored in configuration circuit 308 or other suitable locations included in a computer system or integrated circuit.

90° phase shifter circuit 404 is configured to generate amplified signal 409 using buffered signal 407. In various embodiments, amplified signal 409 may correspond to either of amplified signals 111 and 112. Amplified signal 409 may, in some embodiments, has a similar amplitude to buffered signal 407, but lag buffered signal by a particular phase angle, e.g., 45°. As described below in more detail, 90° phase shifter circuit 404 may include multiple passive circuit elements such as capacitors, inductors, and switches. An amount of phase shift generated by 90° phase shifter circuit may be based, at least in part, on configuration data stored in configuration circuit 308.

Structures such as those shown in FIGS. 2-4 for receiving signals may be referred to using functional language. In some embodiments, these structures may be described as including "a means for receiving a signal encoded in polarized electromagnetic waves," "a means for generating, using the polarized electromagnetic waves, a first received signal on the first port and a second received signal on the second port," "a means for generating a first amplified signal using the first received signal," "a means for generating a second amplified signal using the second received signal, wherein a phase difference between the first amplified signal and the second amplified signal is based on a type of polarization of the polarized electromagnetic waves," and "a means for combining the first amplified signal and the second amplified signal to generate an output signal."

The corresponding structure for "means for receiving a signal encoded in polarized electromagnetic waves" is antenna 201, antenna 202, and their equivalents. The corresponding structure for "means for generating, using the polarized electromagnetic waves, a first received signal on the first port and a second received signal on the second port" is antenna 201, switch 204, antenna 202, switch 203, and their equivalents. Amplifier circuit 401, 180° phase shifter circuit 402, variable gain amplifier circuit 403, 90° phase shifter circuit 404, as well as their equivalents, are the corresponding structure for "means for generating a first amplified signal using the first received signal." The corresponding structure for "means for generating a second amplified signal using the second received signal, wherein a phase difference between the first amplified signal and the second amplified signal is based on a type of polarization of the polarized electromagnetic waves," is amplifier circuit 401, 180° phase shifter circuit 402, variable gain amplifier circuit 403, 90° phase shifter circuit 404, as well as their equivalents. The corresponding structure for "means for combining the first amplified signal and the second amplified signal to generate an output signal" is combiner circuit 303, amplifier circuit 304, and phase shifter circuit 305, and their equivalents.

Figure 5:
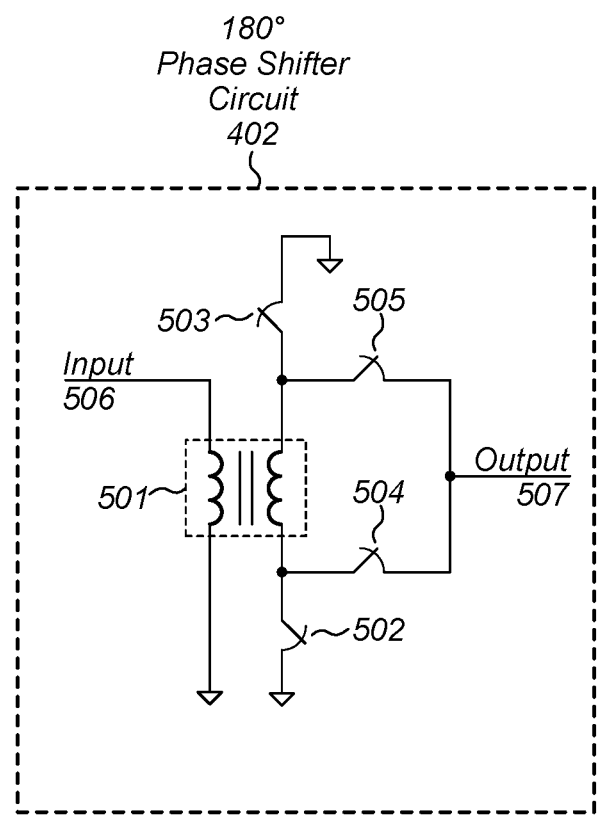
FIG. 5 is a block diagram of a 180° phase shifter circuit.

Turning to FIG. 5, a block diagram of an embodiment of 180° phase shifter circuit 402 is depicted. As illustrated, 180° phase shifter circuit 402 includes transformer 501, and switches 502-505.

A primary coil of transformer 501 is coupled between input 506 and a ground supply node. A first terminal of a secondary coil of transformer 501 is coupled to switches 503 and 505, and a second terminal of the secondary coil of transformer 501 is coupled to switches 502 and 504. Current corresponding to a signal coupled to input 506 that flows through the primary coil of transformer 501 induces a current in the secondary coil of transformer 501 due to inductive coupling between the primary coil and the secondary coil. In various embodiments, a ferromagnetic material (commonly referred to as a "core") may be arranged between the primary and secondary coils of transformer 501. In some embodiments, transformer 501 may be fabricated on a common integrated circuit with other circuits included in receiver circuit 101 using a semiconductor manufacturing process. Alternatively, transformer 501 may be fabricated on a different substrate than the circuits of receiver circuit 101 using any suitable manufacturing process.

Switch 503 is coupled between the first terminal of the secondary coil of transformer 501 and a ground supply node. Switch 505 is coupled to the first terminal of the secondary coil of transformer 501 and output 507. In a similar fashion, switch 502 is coupled between the second terminal of the secondary coil of transformer 501 and the ground supply node, and switch 504 is coupled between the second terminal of the secondary coil of transformer 501 and output 507.

Based on configuration data stored in configuration circuit 308, different ones of switches 502-505 may be closed in order to generate a 180° phase shift or a 0° phase shift. For example, to generate a 0° degree phase shift, switches 505 and 502 may be closed, while switches 503 and 504 are open. Alternatively, to generate a 180° phase shift, switches 503 and 504 may be closed, while switches 502 and 505 are open.

Switches 502-505 may be particular embodiments of mechanical switches, semiconductor switches, or other suitable switch devices. For example, in some embodiments, switches 502-505 may be embodiments of n-channel or p-channel metal-oxide semiconductor field-effect transistors, or any suitable combination thereof.

Figure 6:
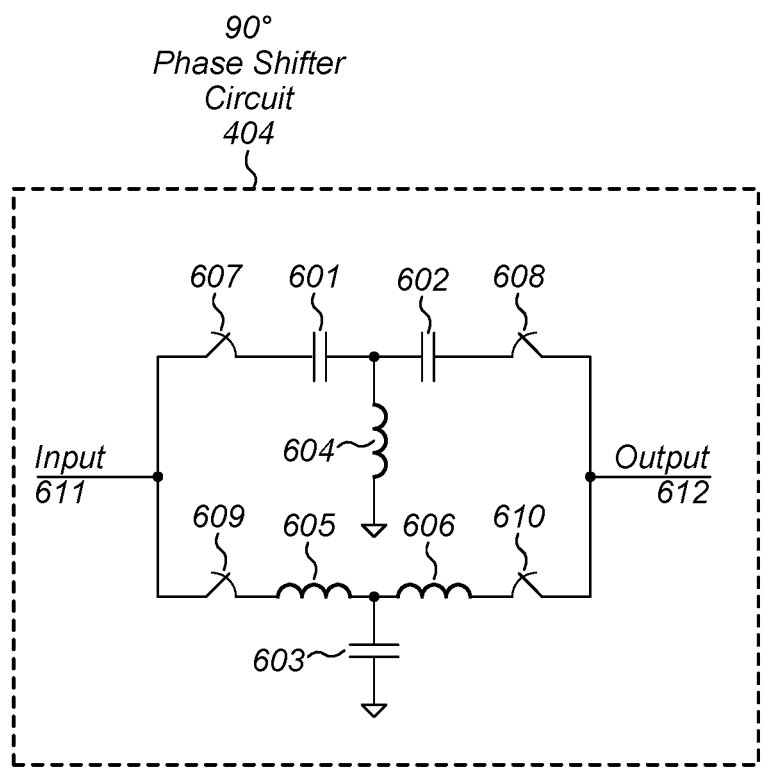
FIG. 6 is a block diagram of a 90° phase shifter circuit.

An embodiment of 90° phase shifter circuit 404 is depicted in FIG. 6. As illustrated, 90° phase shifter circuit 404 includes capacitors 601-603, inductors 604-606, and switches 607-610.

Switch 607 is coupled between input 611 and capacitor 601, which, in turn is coupled to inductor 604 and capacitor 602. Inductor 604 is further coupled to a ground supply node. Switch 608 is coupled between capacitor 602 and output 612. It is noted that although capacitors 601 and 602 are depicted as being single circuit elements, in other embodiments, capacitors 601 and 602 may include any suitable combination of capacitors. In a similar fashion, inductor 604 may, in various embodiments, any suitable combination of inductors.

Switch 609 is coupled between input 611 and inductor 605, which, in turn, is coupled to capacitor 603 and inductor 606. Capacitor 603 is further coupled to the ground supply node. Switch 610 is coupled between inductor 606 and output 612. It is noted that although inductors 605 and 606 are depicted as being single circuit elements, in other embodiments, inductors 605 and 606 may include any suitable combination of inductors. In a similar fashion, capacitor 603 may, in various embodiments, be any suitable combination of capacitors.

As described above, 90° phase shifter circuit 404 is capable of generating either a 45° phase shift of a –45° phase shift. To select which phase shift is used, different ones of switches 607-610 may be closed. Using configuration data stored in configuration circuit 308, which of switches 607-610 to be closed may be determined. For example, to generate a 45° phase shift switches 607 and 608 are closed, while switches 609 and 610 are open. With switches 607 and 608 closed, a signal arriving on input 611 will flow to output 612 via capacitors 601 and 602, and inductor 604. The reactance of capacitors 601 and 602, and inductor 604, phase shifts the signal by 45° before arriving at output 612.

Alternatively, to generate a –45° phase shift, switches 609 and 610 are closed, while switches 607 and 608 are open. With switches 609 and 610 closed, a signal arriving at input 611 will flow to output 612 via inductors 605 and 606, and capacitor 603. The reactance of inductors 605 and 606, and capacitor 603, phase shifts the signal by –45° before it arrives at output 612.

Capacitors 601-603 may be particular embodiments of a metal-oxide-metal (MOM) capacitors or any other suitable capacitor structure capable of being manufactured on an integrated circuit as part of a semiconductor manufacturing process. Inductors 604-606 may, in some embodiments, be fabricated on a common integrated circuit with capacitors 601-603 and switches 607-610. In other embodiments, inductors 604-606 may be fabricated on a different integrated circuit or substrate from the other circuit elements of 90° phase shifter circuit 404.

Switches 607-610 may be particular embodiments of mechanical switches, semiconductor switches, or other suitable switch devices. For example, in some embodiments, switches 607-610 may be embodiments of n-channel or p-channel metal-oxide semiconductor field-effect transistors, or any suitable combination thereof.

Figure 7:
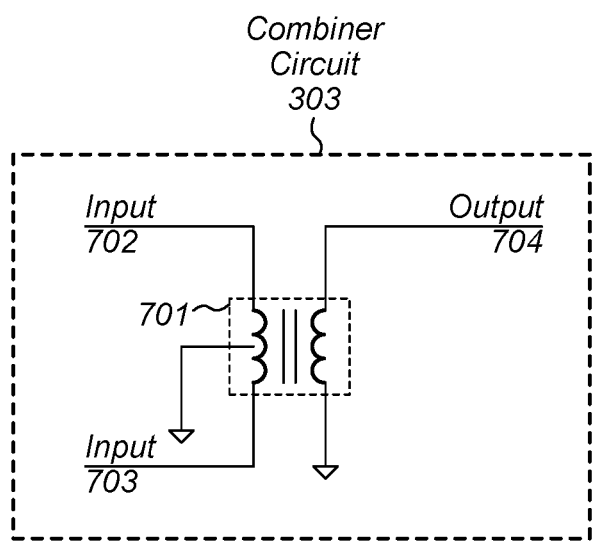
FIG. 7 is a block diagram of a combiner circuit.

Turning to FIG. 7 an embodiment of combiner circuit 303 is depicted. As illustrated, combiner circuit 303 includes transformer 701. A primary coil of transformer 701 is center tapped and coupled between inputs 702 and 703, and is center tapped. The center tap of the primary coil of transformer 701 is coupled to a ground supply node. A secondary coil of transformer 701 is coupled between output 704 and the ground supply node.

A first signal arriving on input 702, e.g., amplified signal 111, generates a current that flows through a first part of the primary coil of transformer 701. The current flowing through the first part of the primary coil of transformer 701 induces a first current in the secondary coil of transformer 701 due to inductive coupling between the primary coil and the secondary coil.

In a similar fashion, a second signal, e.g., amplified signal 112, arriving on input 703 generates a current flowing through a second part of the primary coil of transformer 701. The current flowing through the second part of the primary coil of transformer 701 induces a second current in the secondary coil of transformer 701 due to the inductive coupling between the primary coil and the secondary coil. The first and second currents combine in the secondary coil of transformer 701 to generate a signal, e.g., combined signal 306, on output 704.

It is noted that, in various embodiments, a ferromagnetic material (commonly referred to as a "core") may be arranged between the primary and secondary coils of transformer 701. In some embodiments, transformer 701 may be fabricated on a common integrated circuit with other circuits included in receiver circuit 101 using a semiconductor manufacturing process. Alternatively, transformer 701 may be fabricated on a different substrate than the circuits of receiver circuit 101 using any suitable manufacturing process.

Figure 8:
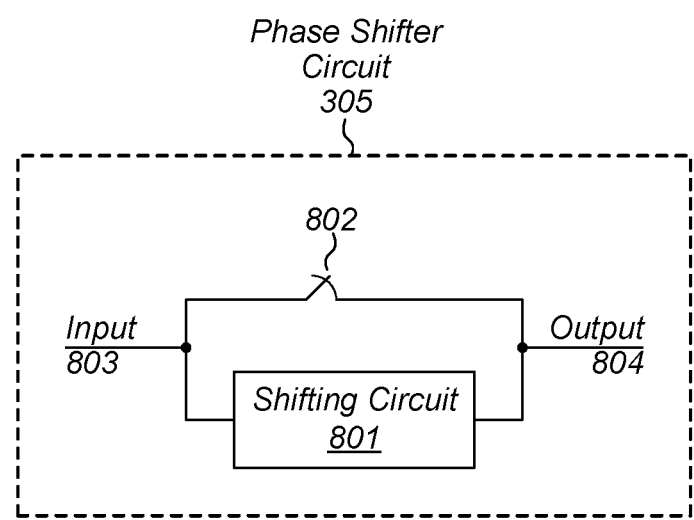
FIG. 8 is a block diagram of a phase shifting circuit.

An embodiment of phase shifter circuit 305 is depicted in FIG. 8. As illustrated, phase shifter circuit 305 includes shifting circuit 801 and switch 802. Both switch 802 and shifting circuit 801 are coupled between input 803 and output 804.

As described above, phase shifter circuit 305 is configured to selectively provide a 45° phase shift or a 0° phase shift. To provide the 0° phase shift, switch 802 is closed providing a low impedance path from input 803 to output 804. To provide the 45° phase shift, switch 802 is opened, allowing a received signal to flow from input 803, through shifting circuit 801, to output 804. In various embodiments, the state, i.e., open or closed, of switch 802 may be controlled by data stored in configuration circuit 308.

In various embodiments, shifting circuit 801 may include any suitable combination of capacitors or inductors arranged to provide a 45° phase shift of a signal, e.g., buffered combined signal 307, as it propagates from input 803 to output 804. It is noted that, in other embodiments, shifting circuit 801 may be configured to provide any suitable phase shift.

Switch 802 may be a particular embodiment of a mechanical switch, semiconductor switch, or other suitable switch device. For example, in some embodiments, switch 802 may be an embodiment of n-channel or p-channel metal-oxide semiconductor field-effect transistors, or any suitable combination thereof.

Figure 9:
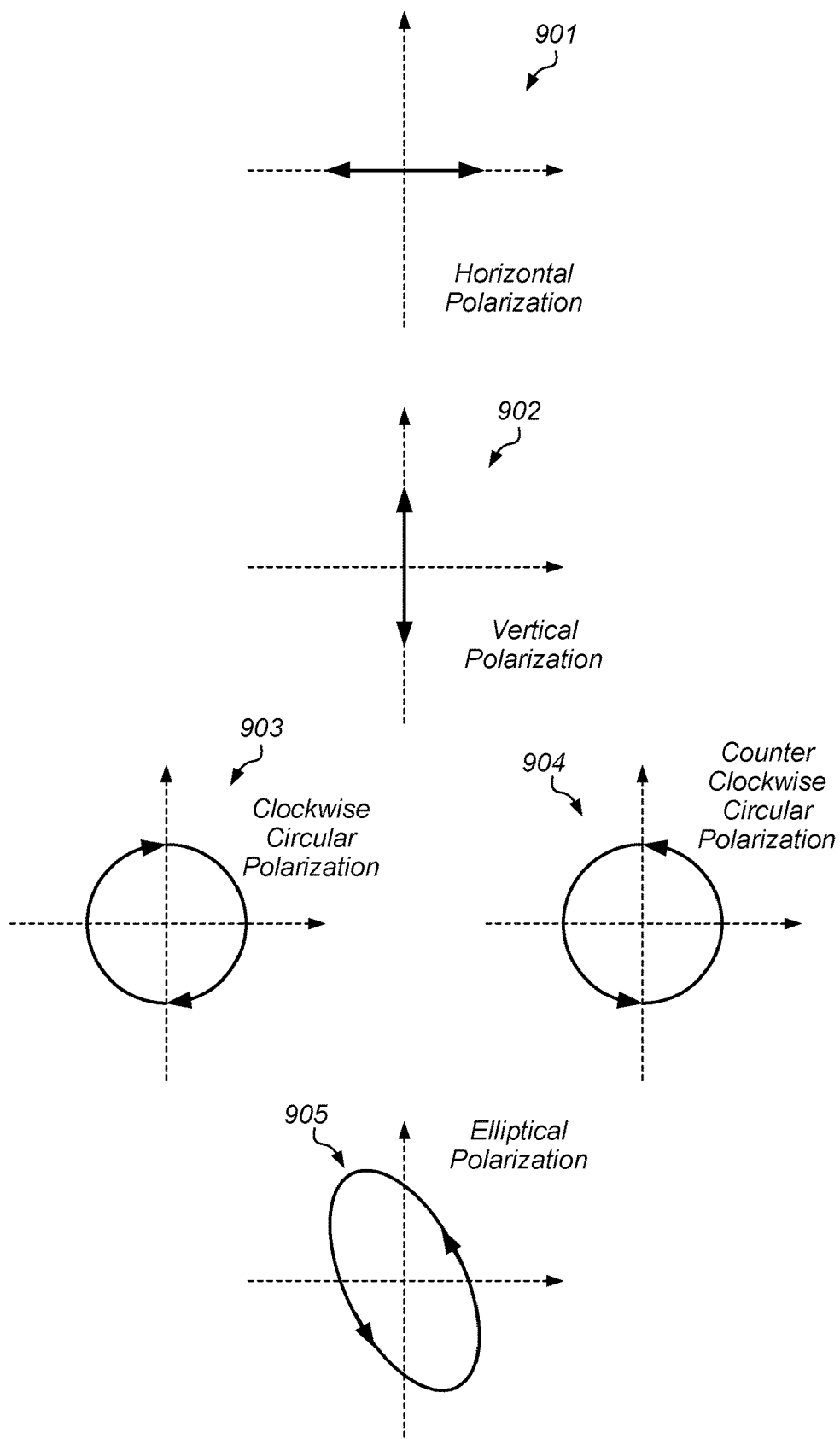
FIG. 9 illustrates various types of polarization.

As described above, electromagnetic waves may be polarized in a variety of ways. Different possible polarizations of electromagnetic waves are depicted in FIG. 9. Each of graphs 901-905 depict the direction of oscillation of electromagnetic waves relative to the direction of propagation of the electromagnetic waves (in to or out of the page).

Graph 901 illustrates horizontal polarization. In this case, the direction of oscillation is parallel to a reference plane, such as the surface of the ground. In contrast, vertical polarization, as illustrated in graph 902, has the direction of oscillation orthogonal to the reference plane.

Graphs 903 and 904 depict circular polarization. In particular, graph 903 illustrates clockwise circular polarization, in which the oscillations of the electromagnetic waves are clockwise around the direction of propagation. Graph 904 depicts counter-clockwise polarization, where the oscillations of the electromagnetic waves oscillate in a counter-clockwise direction around the direction of propagation.

Elliptical polarization is illustrated in graph 905. In this case, the electromagnetic waves oscillate around the direction of propagation (either clockwise or counter-clockwise) in a fashion similar to circular polarization. In elliptical polarization, however, a magnitude of the oscillations varies with the distance from an axis along which the electromagnetic waves are propagation. The polarizations depicted in FIG. 9 are some of multiple possibilities for polarization that may be used for electromagnetic waves, and that transceiver circuit 100 may be configured to operate with the polarizations depicted in FIG. 9 as well as other possible polarizations.

As noted above, the phase difference between the two amplified signals can be adjusted based on a type of polarization used for electromagnetic waves being received, such as those illustrated in FIG. 9. Example settings for receiving or rejecting linearly polarized waves, the phase difference between amplified signals 111 and 112, are listed in Table 1, where φ the phase angle between the horizontally and vertically polarized components of the electromagnetic waves being received. For both the receiving and rejecting linearly polarized electromagnetic waves, the ratio of the gains for circuit path 105 and circuit path 106 may be sin(φ)/cos(φ).

TABLE 1

Linear Polarization Settings

| Phase Angle ( ) | Phase Difference (Receiving) | Phase Difference (Rejecting) |
| --- | --- | --- |
| 0° < φ < 90° | 0° | 180° |
| 90° < φ < 180° | 180° | 0° |

Figure 16:
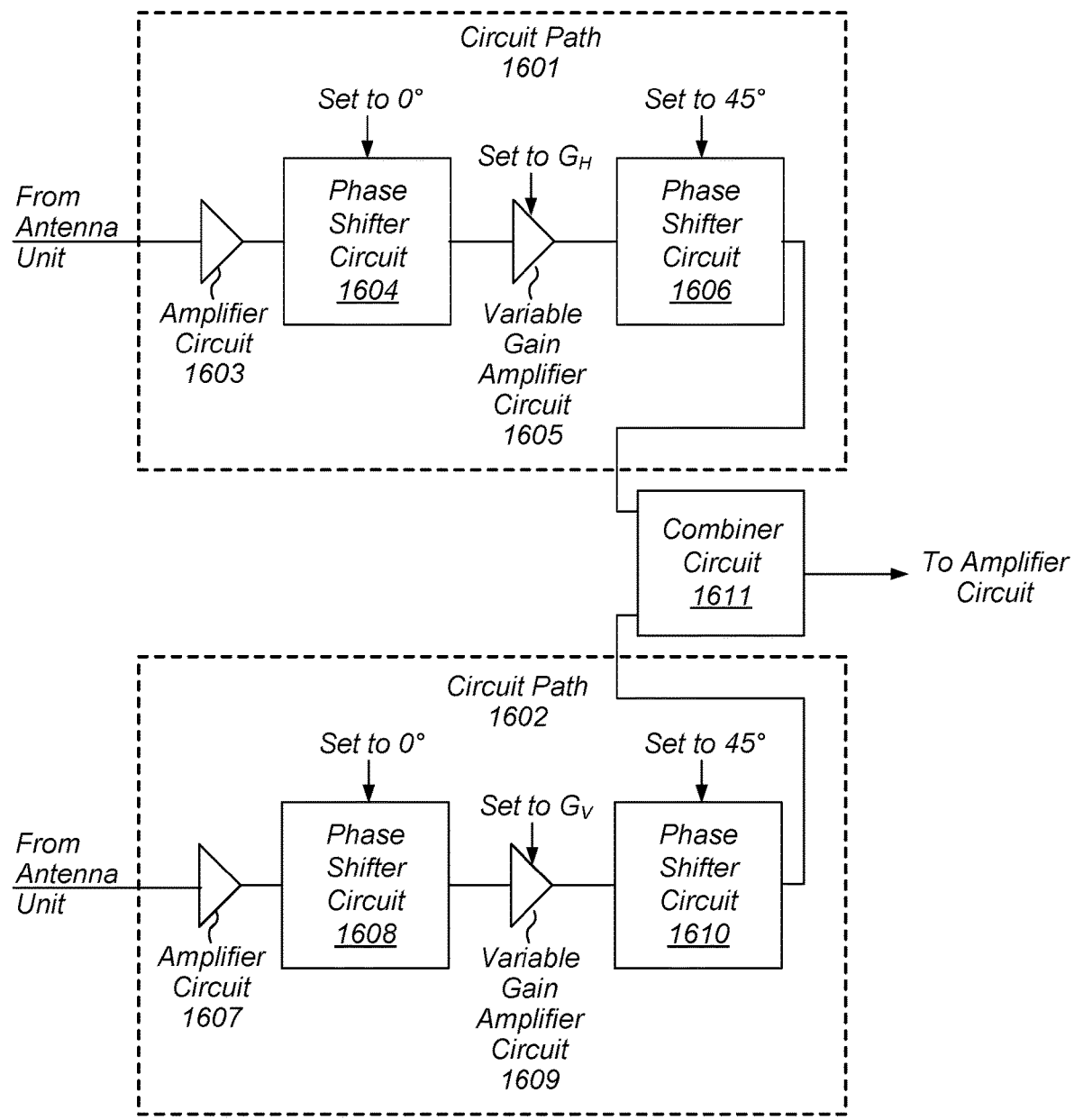
FIG. 16 is a block diagram depicting settings for circuit paths for linear polarization.

An example of how a phase difference of 0° between amplified signals 111 and 112 may be achieved is illustrated in FIG. 16. As illustrated, the embodiment depicted in FIG. 16 includes circuit path 1601, circuit path 1602, and combiner circuit 1610. In various embodiments, circuit path 1601 may correspond to circuit path 105, circuit path 1602 may correspond to circuit path 106, and combiner circuit 1611 may correspond to combiner circuit 303 of FIG. 3.

To realize the desired phase shift through circuit path 1601, phase shifter circuit 1604, which may correspond to phase shifter circuit 180° phase shifter circuit 402 in FIG. 4, may be set to 0°, while phase shifter circuit 1606, which may correspond to 90° phase shifter circuit 404 in FIG. 4, may be set to 45°. The gain of variable gain amplifier 1605, which may correspond to variable gain amplifier 403 of FIG. 4, may be set to $G_H$.

As described above, the phase difference between the two circuit paths should be 0° for phase angles between 0° and 90°. In order for the phase shift of circuit path 1602 to match that of circuit path 1601, phase shifter circuit 1608, which may correspond to 180° phase shifter circuit 402 in FIG. 4, may be set to 0°, while phase shifter circuit 1610, which may correspond to 90° phase shifter circuit 404 in FIG. 4, may be set to 45°. The gain of variable amplifier 1609, which may correspond to variable gain amplifier 403 of FIG. 4, may be set to $G_V$. In some embodiments, $G_H$ and $G_V$ may be selected such that Equation 1 is satisfied, where φ is the phase angle between the two received signals.

$$\frac{G_H}{G_V} = \frac{\sin(\varphi)}{\cos(\varphi)} \quad (1)$$

An example of settings for receiving and rejecting circularly polarized electromagnetic waves are listed in Table 2. In the case of circular polarization, the ratio of the gains for circuit path 105 and circuit path 106 may be $A_y/A_x$, where $A_y$ and $A_x$ are respective amplitudes of the vertical and horizontal components of the circularly polarized electromagnetic waves. It is noted that that settings listed in Tables 1 and 2 are examples, and that other settings are possible. Additionally, different settings may be used for other types of polarization, e.g., elliptical, that are not listed in Tables 1 and 2.

TABLE 2

Circular Polarization Settings

| Phase Angle ( ) | Phase Difference (Receiving) | Phase Difference (Rejecting) |
| --- | --- | --- |
| Right-Hand Polarization | 90° | −90° |
| Left-Hand Polarization | −90° | 90° |

Figure 17:
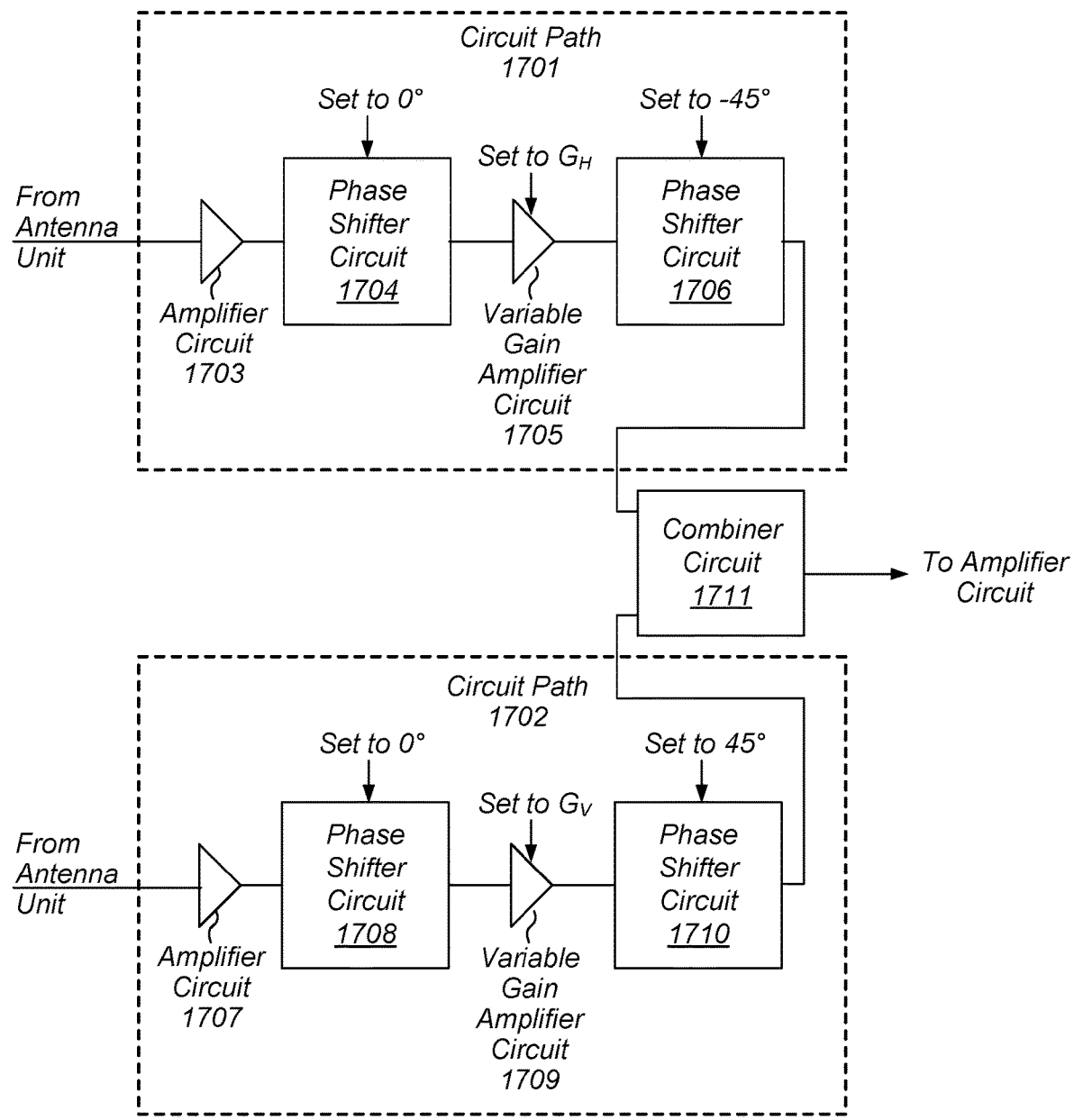
FIG. 17 is a block diagram depicting settings for circuit paths in a transceiver circuit for circular or elliptical polarization.

An example of how a phase difference of 90° between amplified signals 111 and 112 may be achieved is illustrated in FIG. 17. As illustrated, the embodiment depicted in FIG. 17 includes circuit path 1701, circuit path 1702, and combiner circuit 1711. In various embodiments, circuit path 1701 may correspond to circuit path 105, circuit path 1702 may correspond to circuit path 106, and combiner circuit 1711 may correspond to combiner circuit 303 of FIG. 3.

To realize the desired phase shift through circuit path 1701, phase shifter circuit 1704, which may correspond to phase shifter circuit 180° phase shifter circuit 402 in FIG. 4, may be set to 0°, while phase shifter circuit 1706, which may correspond to 90° phase shifter circuit 404 in FIG. 4, may be set to −45°. The gain of variable gain amplifier 1705, which may correspond to variable gain amplifier 403 of FIG. 4, may be set to $G_H$.

As described above, the phase difference between the two circuit paths should be 90° for right hand polarization. In order for the phase difference between circuit path 1701 and 1702 to be 90°, phase shifter circuit 1708, which may correspond to 180° phase shifter circuit 402 in FIG. 4, may be set to 0°, while phase shifter circuit 1710, which may correspond to 90° phase shifter circuit 404 in FIG. 4, may be set to 45°. The gain of variable amplifier 1709, which may correspond to variable gain amplifier 403 of FIG. 4, may be set to $G_V$. In some embodiments, $G_H$ and $G_V$ may be selected such that Equation 2 is satisfied, where φ is the phase angle between the two received signals.

$$\frac{G_H}{G_V} = \frac{A_y}{A_x} \quad (2)$$

Figure 10:
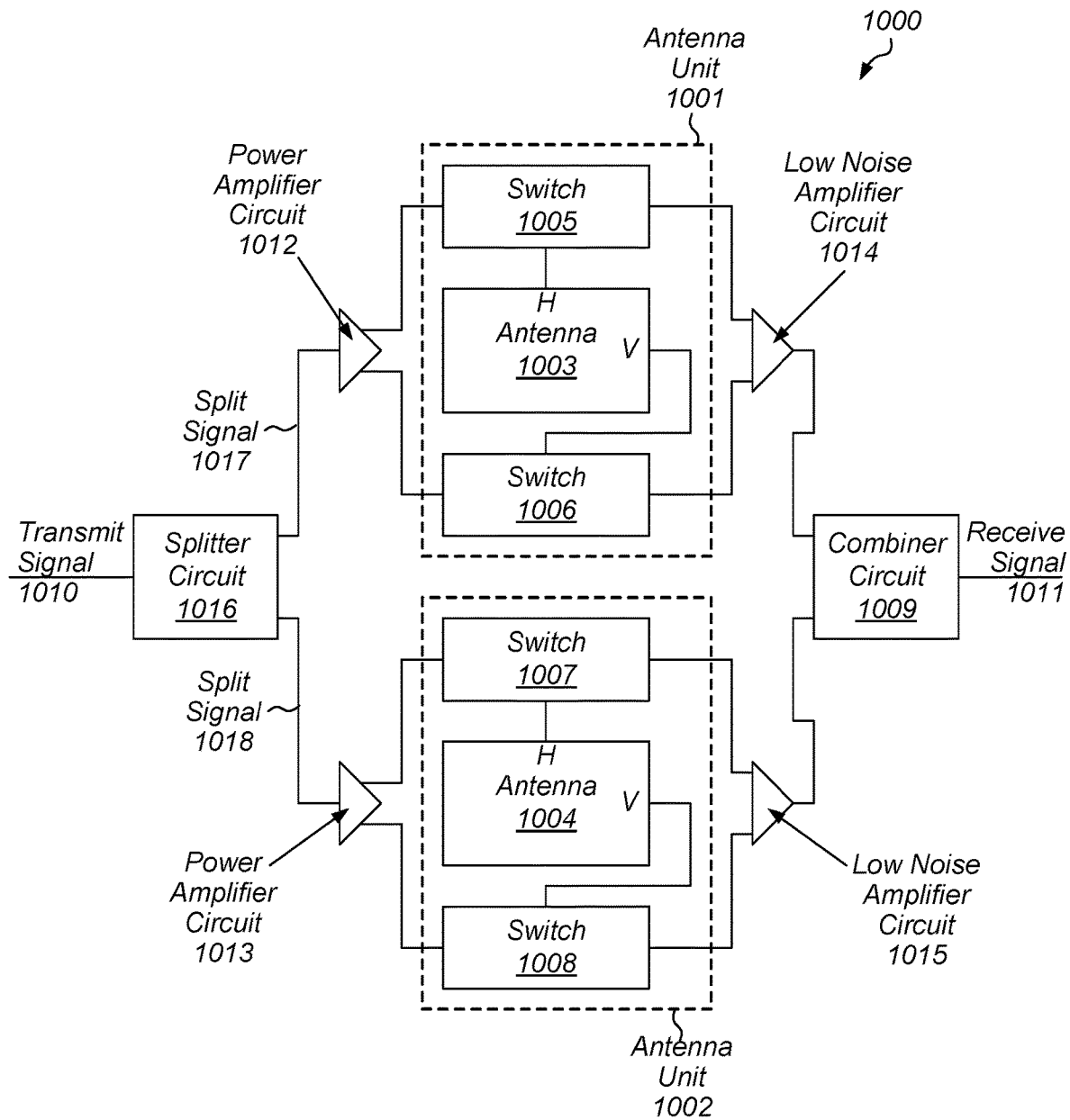
FIG. 10 is a block diagram of a phased array.

In some cases, spatial filtering or beam forming may be employed to improve signal transmission or reception quality. To make use of such techniques, a phased array that includes multiple antenna units, may be employed. A block diagram of a phased array is depicted in FIG. 10. As illustrated, phase array 1000 includes antenna units 1001 and 1002, splitter circuit 1016, combiner circuit 1009, power amplifier circuits 1013, and low noise amplifier circuits 1014 and 1015. Although only two antenna units, two low noise amplifier circuits, two power amplifier circuits, and single splitter and combiner circuits are illustrated in the embodiment of FIG. 10, in other embodiments, any suitable number of antenna units, low noise amplifier circuits, power amplifier circuits, splitter circuits, and combiner circuits may be employed.

Antenna unit 1001 includes switches 1005 and 1006, and antenna 1003. Antenna unit 1002 includes switches 1007 and 1008, and antenna 1004. In various embodiments, antenna units 1001 and 1002 may be particular embodiments of antenna unit 102 as illustrated in FIG. 1 and FIG. 2.

Outputs from antenna unit 1001 are coupled to inputs of low noise amplifier circuit 1014 and inputs to antenna unit 1001 are coupled to outputs of power amplifier circuit 1012. In various embodiments, low noise amplifier circuit 1014 and power amplifier circuit 1012 may be embodiments of transceiver circuit 100 as illustrated in FIG. 1.

Outputs from antenna unit 1002 are coupled to inputs of low noise amplifier circuit 1015 and inputs to antenna unit 1002 are coupled to outputs of power amplifier circuit 1013. In various embodiments, low noise amplifier circuit 1015 and power amplifier circuit 1013 may be embodiments of transceiver circuit 100 as illustrated in FIG. 1.

The outputs of low noise amplifier circuits 1014 and 1015 are coupled to combiner circuit, which is configured to generate receive signal 1011 using the outputs of low noise amplifier circuits 1014 and 1015. In various embodiments, combiner circuit 1009 may be a particular embodiment of a Wilkinson combiner circuit configured to combine the outputs of low noise amplifier circuits 1014 and 1015 to generate receive signal 1011. In various embodiments, combiner circuit 1009 may employ quarter-wave transformers to combine the outputs of low noise amplifier circuits 1014 and 1015.

The outputs of power amplifier circuits 1012 and 1013 are coupled to switches in antenna units 1001 and 1002, respectively. The inputs of power amplifier circuits 1012 and 1013 are coupled to the output of splitter circuit 1016. In various embodiments, power amplifier circuits 1012 and 1013 may be particular embodiments of receiver circuit 101 with the signal flow reversed. Power amplifier circuits 1012 and 1013 may be configured to generate drive signals to drive antennas within antenna units 1001 and 1002. Such drive signals may be out of phase with each other in other to induce out of phase currents in the antennas, thereby generating electromagnetic waves.

Splitter circuit 1016 is configured to receive transmit signal 1010 and generate split signals 1017 and 1018. In some embodiments, splitter circuit 1016 may be a particular embodiment of a Wilkinson splitter circuit configured to generate split signals 1017 and 1018 by splitting power of transmit signal 1010. In various embodiments, splitter circuit 1016 may employ quarter-wave transformer circuits to split transmit signal into split signals 1017 and 1018.

Figure 11:
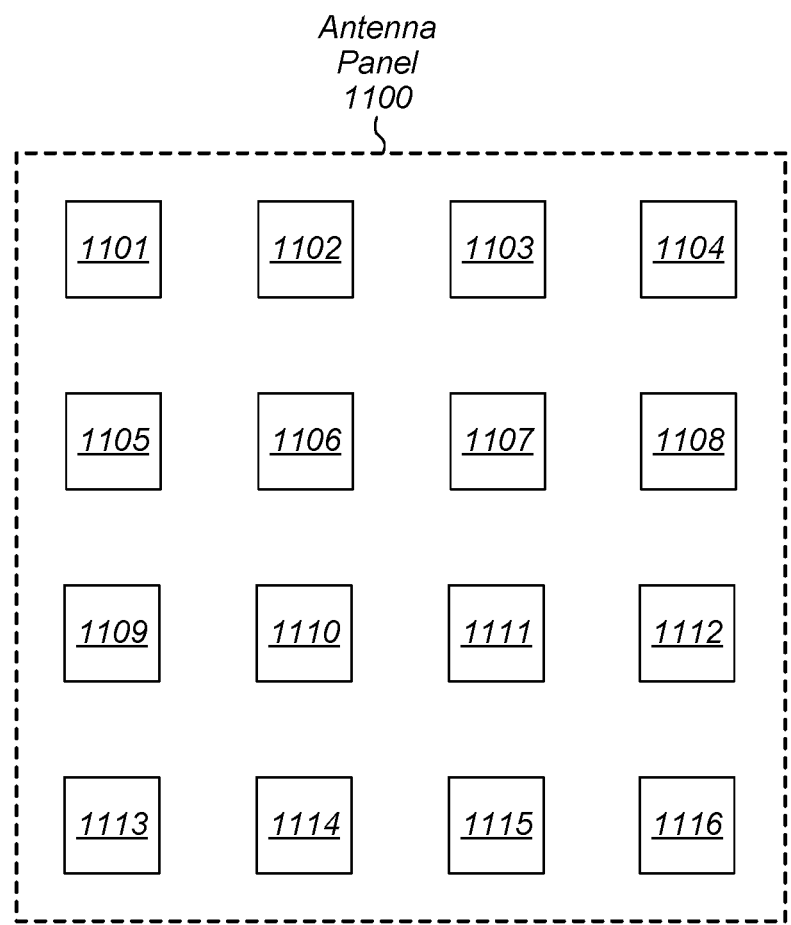
FIG. 11 is a block diagram of an antenna array.

Turning to FIG. 11, a block diagram of an antenna panel is depicted. As illustrated, antenna panel 1100 includes antenna units 1101-1116. In various embodiments, antenna unit 102, antenna unit 1001, and antenna unit 1002 may correspond to any of antenna units 1101-1116, and may be employed to realize beam forming or other spatial filtering techniques.

As described above, any of antenna units 1101-1106 may include multiple antennas oriented to for different polarizations, e.g., horizontal or vertical. In some embodiments, such multiple antennas included in antenna panel 1100 may be fabricated on a common integrated circuit with multiple ones of power amplifier circuit, low noise amplifier circuits, and splitter circuits, combiner circuits as depicted in FIG. 10. Alternatively, antenna panel 1100 may be fabricated on a separate integrated circuit or substrate from the power amplifier circuit, low noise amplifier circuits, and splitter circuits, combiner circuits.

Figure 12:
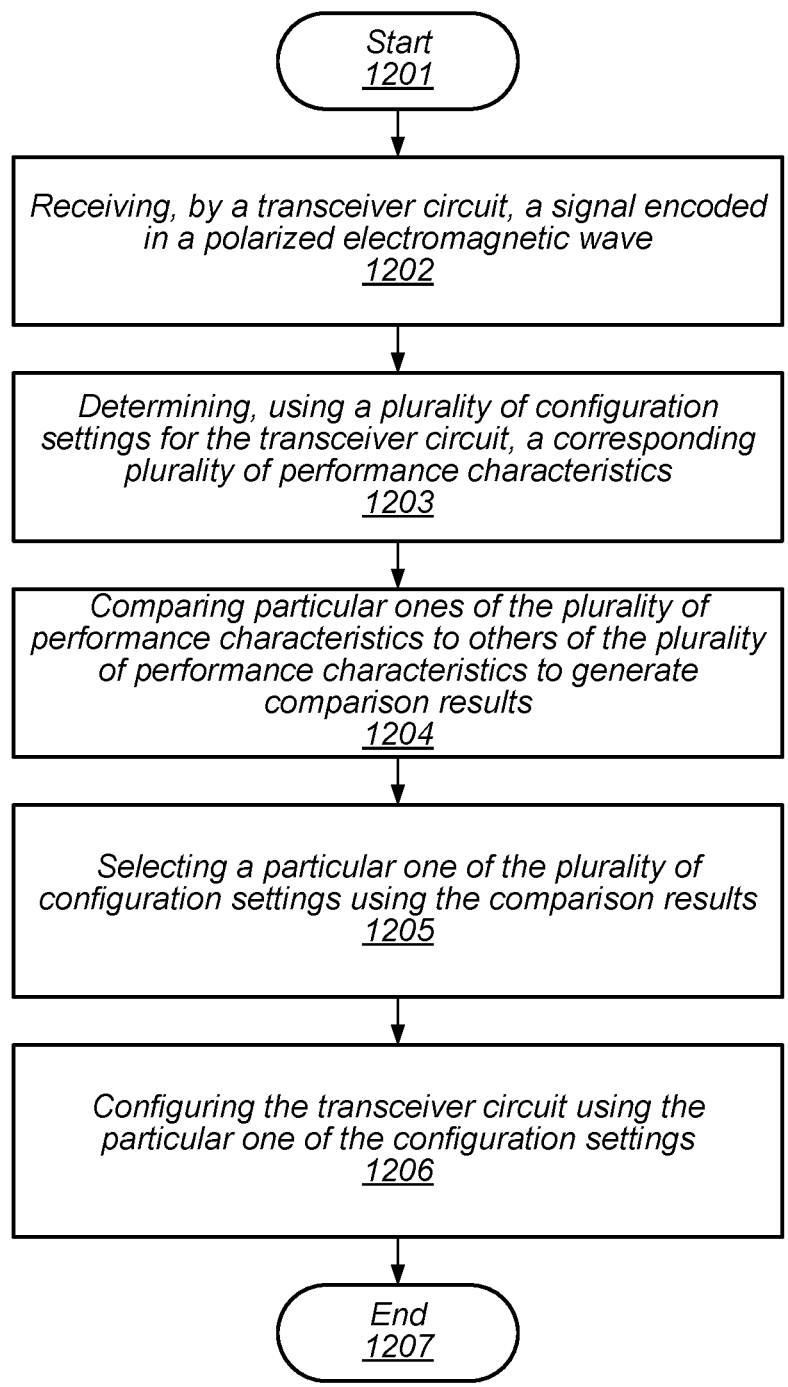
FIG. 12 illustrates a flow diagram depicting an embodiment of a method for configuring a transceiver circuit with polarization selection.

An embodiment of a method for configuring a transceiver circuit is illustrated in the flow diagram of FIG. 12. The method, which begins in block 1201, may be applied to transceiver circuit 100 or any other suitable transceiver circuit. It is noted that in some embodiments, the method depicted in the flow diagram of FIG. 12 may be performed by a general-purpose processor executing software instructions in combination with transceiver circuit 100.

The method includes receiving, by an antenna unit, a signal encoded in polarized electromagnetic waves (block 1202). In various embodiments, the electromagnetic waves may be polarized in a horizontal or vertical fashion. Alternatively, the electromagnetic waves may be polarized in a circular (either clockwise or counter clockwise) or elliptical fashion.

The method also includes determining, using a plurality of configuration settings for the transceiver circuit, a corresponding plurality of performance characteristics (block 1203). In some embodiments, determining the corresponding plurality of performance characteristics includes measuring a signal-to-noise ratio of the transceiver circuit using a given one of the plurality of configuration settings. In some cases, transceiver circuit 100 may include one or more test circuits configured to make measurements of the signal-to-noise ratio. Alternatively, test circuits external to transceiver circuit 100 may be employed to measure the signal-to-noise ratio.

In other embodiments, the method may include determining the corresponding plurality of performance characteristics includes determining interference rejection of the transceiver circuit using a given one of the plurality of configuration settings. As with measuring the signal-to-noise ratio, determining the interference rejection may employ one or more test circuits including in, or external to transceiver circuit 100.

In various embodiments, determining, using the plurality of configuration settings for the transceiver circuit, the corresponding plurality of performance characteristics includes deactivating a circuit path in the transceiver circuit in response to using a given on of the plurality of configuration settings. For example, when one particular configuration is being used, the circuit path is coupled to an antenna with a horizontal orientation is deactivated. In other cases, the circuit path coupled to an antenna with a vertical orientation is deactivated.

The method further includes comparing particular ones of the plurality of performance characteristics to others of the plurality of performance characteristics to generate comparison results (block 1204).

The method also includes selecting a particular one of the plurality of configuration settings using the comparison results (block 1205). In various embodiments, the comparison results include information indicative of which configuration setting generated a largest signal-to-noise ratio, signal rejection, and the like. Based on desired operation of the transceiver circuit, the configuration setting that generated a desired signal-to-noise ratio, signal rejection, and the like, will be selected for operation of the transceiver circuit.

The method further includes configuring the transceiver circuit using the particular one of the configuration settings (block 1206). In various embodiments, configuring the transceiver circuit using the particular one of the plurality of configuration settings includes setting at least one switch of a plurality of switches included in the transceiver circuit to an open position. As described above, each of circuit paths 105 and 106 may include multiple switches whose positions determine how received signals 109 and 110 are processed to generate amplified signals 111 and 112. The configuration settings may include information that indicates positions for the switches in circuit paths 105 and 106.

In some embodiments, the method may also include adjusting gain values for at least one variable gain amplifier included in the transceiver circuit. The adjustment in gain values may be used for fine tuning the transceiver circuit to maximum signal-to-noise ratio, increase attenuation of polarization components to be rejected, and the like. The method concludes in block 1207.

Figure 13:
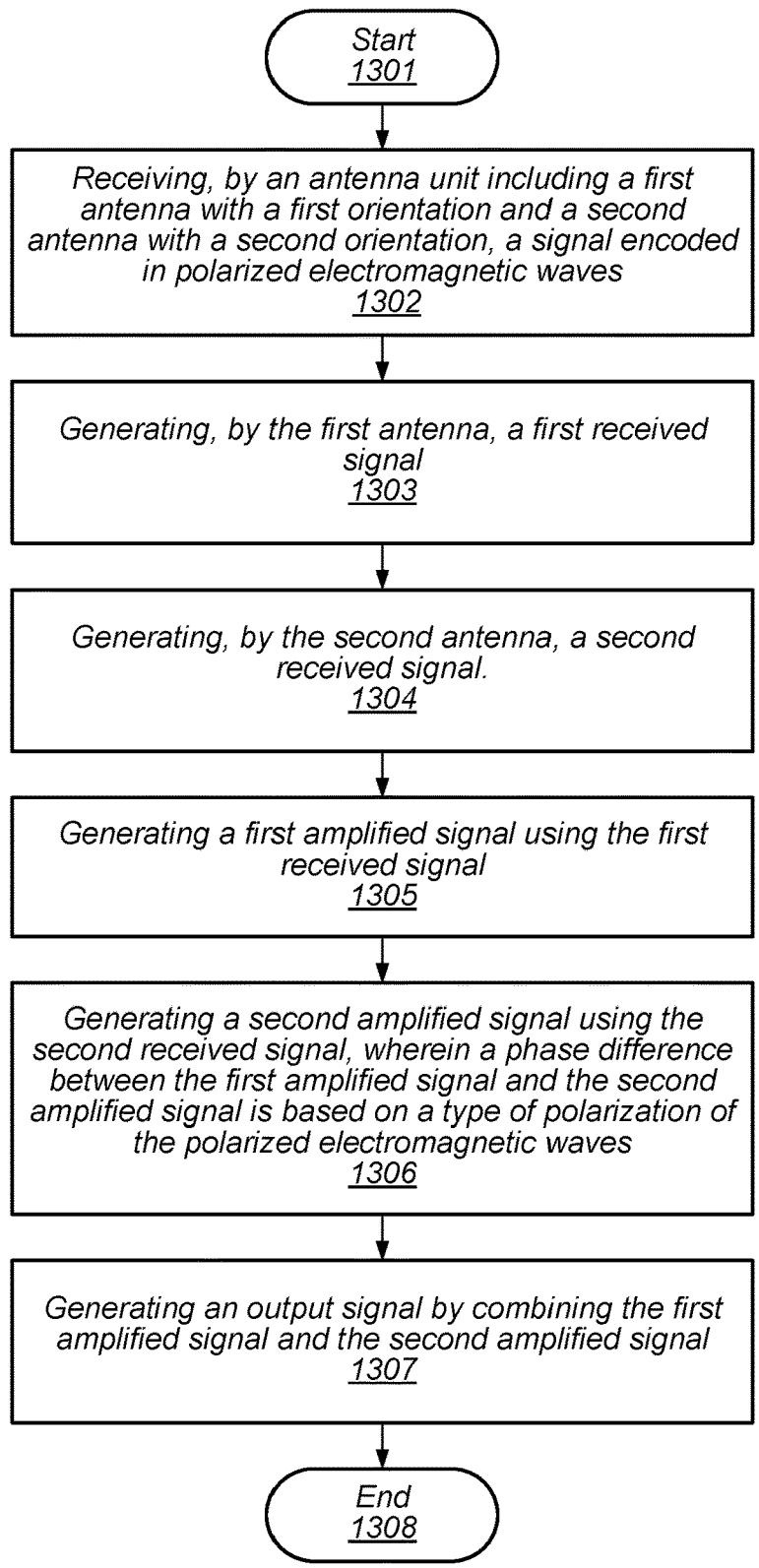
FIG. 13 illustrates a flow diagram depicting an embodiment of a method for operating a transceiver circuit with polarization selection.

Turning to FIG. 13, an embodiment of a method for operating a transceiver circuit is illustrated. The method, which begins in block 1301, may be applied to transceiver circuit 100 or any other suitable transceiver circuit.

The method includes receiving, by an antenna unit including a first antenna with a first orientation and a second antenna with a second orientation, a signal encoded in polarized electromagnetic waves (block 1301). In various embodiments, the orientation of the antennas may be determined relative to the ground. In such cases, the first orientation may correspond to a horizontal orientation, i.e., an orientation parallel to the ground, and the second orientation may correspond to a vertical orientation, i.e., an orientation perpendicular to the ground.

The method also includes generating, by the first antenna, a first received signal (block 1302). Additionally, the method includes generating, by the second antenna, a second received signal (block 1303). The method may, in some embodiments, include inducing a first current in the first antenna using the polarized electromagnetic waves, and inducing a second current in the second antenna using the polarized electromagnetic waves.

The method also includes generating a first amplified signal using the first received signal (block 1304). Generating the first amplified signal may, in some embodiments, include amplifying the first received signal to generate a first buffered signal, and selectively, phase shifting the first buffered signal to generate a first phase-shifted signal. In various embodiments, an amount of phase shift used to generate the first phase-shifted signal may be based, at least in part, on one or more configuration settings determined during a configuration process, such as that depicted in the flow diagram of FIG. 12.

Additionally, the method may include amplifying the first phase-shifted signal to generate a second buffered signal, and selectively, phase shifting the second buffered signal to generate the first received signal. As described above, an amount of phase shift used to generate the first received signal may be based, at least in part, on the one or more configuration setting.

The method further includes generating a second amplified signal using the second received signal, wherein a phase difference between the first amplified signal and the second amplified signal is based on a type of polarization of the polarized electromagnetic waves (block 1305). In various embodiments, generating the second amplified signal may include amplifying the second received signal to generate a third buffered signal, and selectively, phase shifting the third buffered signal to generate a second phase-shifted signal. The method may additionally include the method may include amplifying the second phase-shifted signal to generate a fourth buffered signal, and selectively, phase shifting the fourth buffered signal to generate the first received signal. It is noted that the respective amounts of phase shift introduce in the two phase shifting operations may be based, at least in part, on the configuration settings.

The method also includes generating an output signal by combining the first amplified signal and the second amplified signal (block 1306). In various embodiments, the method may include coupling the first amplified signal and the second amplified signal into a primary coil of a transformer to generate a first current in the primary coil. Additionally, the method may include inducing, a secondary coil of the transformer, where a value of the second current is based, at least in part, on a value of the first current, and a coupling coefficient associated with the transformer. As used herein, a coupling coefficient is a measure of an amount of inductive coupling between two inductors, such as a primary and secondary coil of a transformer. The method concludes in block 1307.

Figure 14:
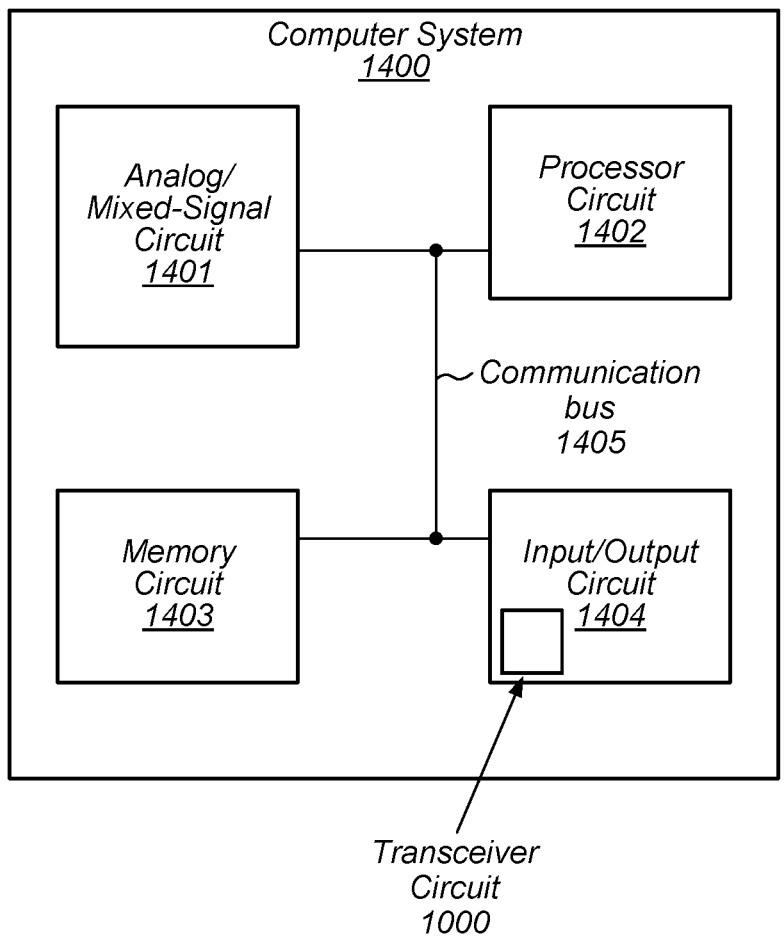
FIG. 14 is a block diagram of one embodiment of a computer system that includes a power generator circuit.

A block diagram of computer system is illustrated in FIG. 14. As illustrated embodiment, the computer system 1400 includes analog/mixed-signal circuits 1401, processor circuit 1402, memory circuit 1403, and input/output circuits 1404, each of which is coupled to communication bus 1405. In various embodiments, computer system 1400 may be a system-on-a-chip (SoC) and be configured for use in a desktop computer, server, or in a mobile computing application such as, a tablet, laptop computer, or wearable computing device.

Analog/mixed-signal circuits 1401 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 1401 may be configured to perform power management tasks with the inclusion of on-chip power supplies and voltage regulators.

Processor circuit 1402 may, in various embodiments, be representative of a general-purpose processor that performs computational operations. For example, processor circuit 1402 may be a central processing unit (CPU) such as a microprocessor, a microcontroller, an application-specific integrated circuit (ASIC), or a field-programmable gate array (FPGA).

Memory circuit 1403 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of a computer system in FIG. 14, a single memory circuit is depicted. In other embodiments, any suitable number of memory circuits may be employed.

Input/output circuits 1404, which includes transceiver circuit 100, may be configured to coordinate data transfer between computer system 1400 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1404 may be configured to implement a version of Universal Serial Bus (USB) protocol or IEEE 1394 (Firewire®) protocol.

Figure 15:
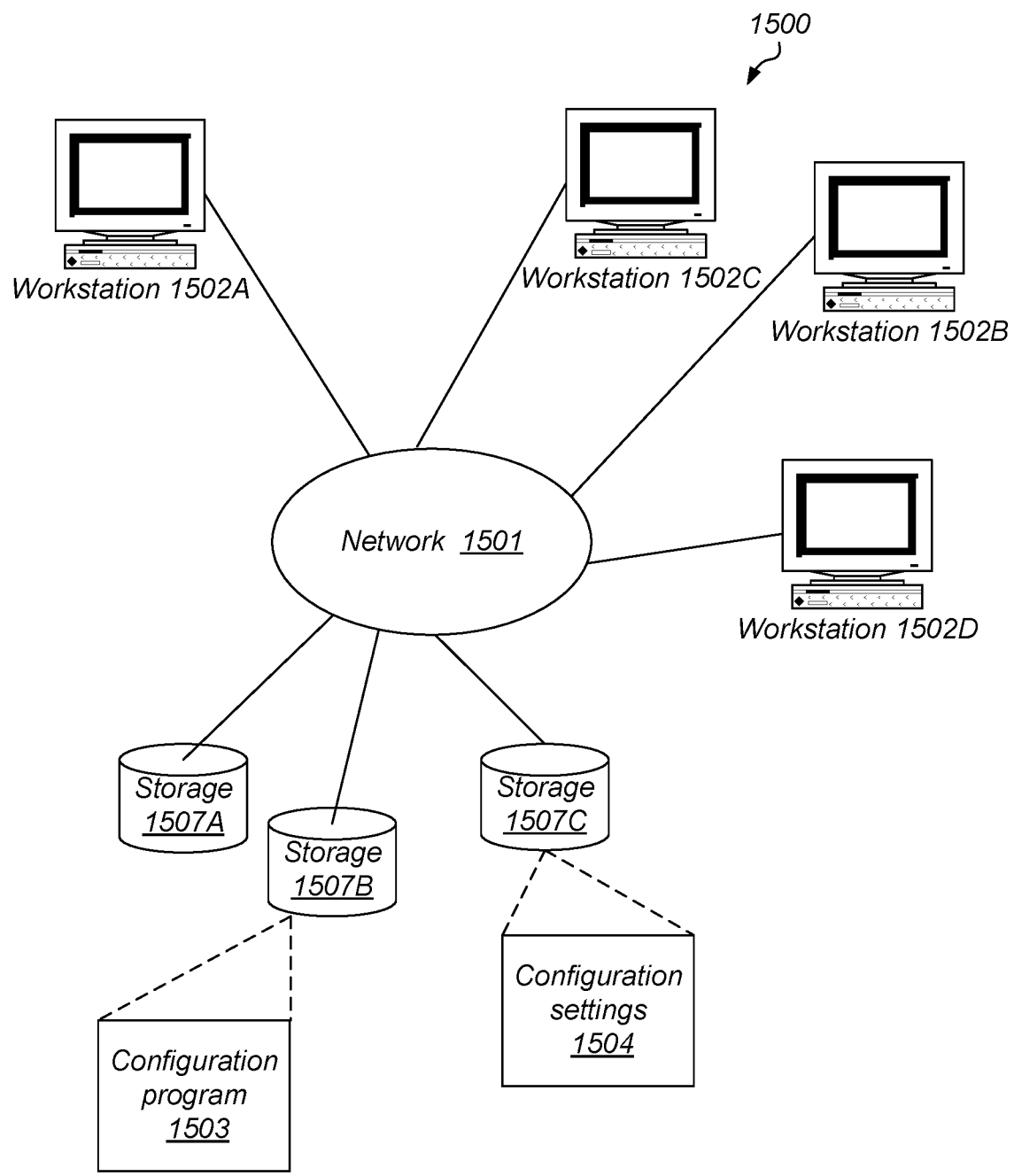
FIG. 15 is a block diagram depicting a computer system coupled together using a network.

Turning to FIG. 15, a block diagram depicting an embodiment of a computer network is illustrated. The computer system 1500 includes a plurality of workstations designated 1502A through 1502D. The workstations are coupled together through a network 1501 and to a plurality of storage devices designated 1507A through 1507C. In one embodiment, each of workstations 1502A-1502D may be representative of any standalone computing platform that may include, for example, one or more processors, local system memory including any type of random-access memory (RAM) device, monitor, input output (I/O) means such as a network connection, mouse, keyboard, monitor, and the like (many of which are not shown for simplicity).

In one embodiment, storage devices 1507A-1507C may be representative of any type of mass storage device such as hard disk systems, optical media drives, tape drives, ram disk storage, and the like. As such, program instructions for different applications may be stored within any of storage devices 1507A-1507C and loaded into the local system memory of any of the workstations during execution. As an example, configuration program 1503 is shown stored within storage device 1507B, and a plurality of configuration settings 1504 are shown stored within storage device 1507C. Storage devices 1507A-1507C may, in various embodiments, be particular examples of computer-readable, non-transitory media capable of storing instructions that, when executed by a processor, cause the processor to implement all or part of various methods and techniques described herein. Some non-limiting examples of computer-readable media may include tape reels, hard drives, CDs, DVDs, flash memory, print-outs, etc., although any tangible computer-readable medium may be employed to store configuration program 1503.

In one embodiment, configuration program 1503 may perform a configuration of transceiver circuit 100 using operations similar to those described in FIG. 12. In various embodiments, configuration program 1503 may determine, using the plurality of configuration settings 1504 for the transceiver circuit, a corresponding plurality of performance characteristics.

Input/output circuits 1404 may also be configured to coordinate data transfer between computer system 1400 and one or more devices (e.g., other computing systems or integrated circuits) coupled to computer system 1400 via a network. In one embodiment, input/output circuits 1404 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1404 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   an antenna unit including a first port coupled to a first antenna with a particular orientation and a second port coupled to a second antenna with a different orientation orthogonal to the particular orientation, wherein the antenna unit is configured to:
   receive information encoded in polarized electromagnetic waves; and
   generate, using the polarized electromagnetic waves, a first received signal on the first port and a second received signal on the second port;
   a first circuit path that includes:
     a first amplifier circuit configured to amplify the first received signal to generate a first buffered signal;
     a first phase shifter circuit configured to phase shift the first buffered signal to generate a first phase-shifted signal;
     a second amplifier circuit configured to amplify the first phase-shifted signal to generate a second buffered signal; and
     a second phase shifter circuit configured to phase shift the second buffered signal to generate a first amplified signal;
   a second circuit path that includes:
     a third amplifier circuit configured to amplify the second received signal to generate a third buffered signal;
     a third phase shifter circuit configured to phase shift the third buffered signal to generate a third phase-shifted signal;
     a fourth amplifier circuit configured to amplify the third phase-shifted signal to generate a fourth buffered signal; and
     a fourth phase shifter circuit configured to phase shift the fourth buffered signal to generate a second amplified signal; and
   a combiner circuit configured to combine the first amplified signal and the second amplified signal to generate an output signal.

2. The apparatus of claim 1, wherein the first phase shifter circuit includes a transformer that includes a primary coil and a secondary coil, wherein the primary coil is coupled between the first buffered signal and a ground supply node, and wherein the first phase shifter circuit is configured to selectively couple the secondary coil between the ground supply node and the first phase-shifted signal.

3. The apparatus of claim 1, wherein the second phase shifter circuit includes a first circuit and a second circuit, wherein the second phase shifter circuit is further configured to selectively couple either the first circuit or the second circuit between the second buffered signal and the first amplified signal, wherein the first circuit is configured to phase shift the second buffered signal by 45 degrees, and wherein the second circuit is configured to phase shift, by −45 degrees, the second buffered signal.

4. The apparatus of claim 1, a wherein the combiner circuit includes a transformer, wherein a primary coil included in the transformer is coupled between the first amplified signal and the second amplified signal, and wherein a secondary coil included in the transformer is coupled between an input to an amplifier circuit and a ground supply node.

5. The apparatus of claim 1, wherein the first phase shifter circuit is configured to phase shift the first buffered signal by a first phase shift, and wherein the second phase shifter circuit is configured to phase shift the second buffered signal by a second phase shift different than the first phase shift.

6. The apparatus of claim 5, wherein the first phase shift is 180-degrees, and wherein the second phase shift is 90-degrees.

7. A method, comprising:
receiving, by a transceiver circuit that includes an antenna unit, a signal encoded in a polarized electromagnetic wave, wherein the antenna unit includes a first port coupled to a first antenna with a particular orientation, and a second port coupled to a second antenna with a different orientation orthogonal to the particular orientation;
determining, using a plurality of configuration settings for the transceiver circuit, a plurality of performance characteristics;
comparing particular ones of the plurality of performance characteristics to other ones of the plurality of performance characteristics to generate comparison results;
selecting a particular one of the plurality of configuration settings using the comparison results;
configuring the transceiver circuit using the particular one of the configuration settings;
amplifying, by a first amplifier circuit included in the transceiver circuit, a first signal received via the first port to generate a first buffered signal;
phase shifting, by a first phase-shifter circuit included in the transceiver circuit, the first buffered signal to generate a first phase-shifted signal;
amplifying, by a second amplifier circuit included in the transceiver circuit, the first phase-shifted signal to generate a second buffered signal;
phase shifting, by a second phase-shifter circuit included in the transceiver circuit, the second buffered signal to generate a first amplified signal;
amplifying, by a third amplifier circuit included in the transceiver circuit, a second signal received via the second port to generate a third buffered signal;
phase shifting, by a third phase-shifter circuit included in the transceiver circuit, the third buffered signal to generate a third phase-shifted signal;
amplifying, by a fourth amplifier circuit included in the transceiver circuit, the third phase-shifted signal to generate a fourth buffered signal;
phase shifting, by a fourth phase-shifter circuit included in the transceiver circuit, the fourth buffered signal to generate a second amplified signal; and
combining, by the transceiver circuit, the first amplified signal and the second amplified signal to generate an output signal.

8. The method of claim 7, wherein the second amplifier circuit includes a variable gain amplifier circuit, further comprising adjusting gain values for the variable gain amplifier circuit.

9. The method of claim 7, wherein determining the plurality of performance characteristics includes measuring a signal-to-noise ratio of the transceiver circuit using a given one of the plurality of configuration settings.

10. The method of claim 7, wherein determining the plurality of performance characteristics includes determining interference rejection of the transceiver circuit using a given one of the plurality of configuration settings.

11. The method of claim 7, wherein configuring the transceiver circuit using the particular one of the plurality of configuration settings includes setting at least one switch of a plurality of switches included in the transceiver circuit to an open position.

12. The method of claim 7, wherein determining, using the plurality of configuration settings for the transceiver circuit, the plurality of performance characteristics includes deactivating a circuit path in the transceiver circuit in response to using a given one of the plurality of configuration settings, wherein the circuit path is coupled to the first port, and wherein the particular orientation is a horizontal orientation.

13. The method of claim 7, wherein determining, using the plurality of configuration settings for the transceiver circuit, the plurality of performance characteristics includes deactivating a circuit path in the transceiver circuit in response to using a given one of the plurality of configuration settings, wherein the circuit path is coupled to the second port, and wherein the different orientation is a vertical orientation.

14. An apparatus, comprising:
an antenna panel including a plurality of antenna units configured to receive a signal encoded in polarized electromagnetic waves, wherein the plurality of antenna units includes a given antenna unit that includes a first antenna with a particular orientation, and a second antenna with a different orientation orthogonal to the particular orientation, wherein the first antenna is configured to generate a first antenna signal and the second antenna is configured to generate a second antenna signal;
a plurality of transceiver circuits coupled to the plurality of antenna units, wherein a particular transceiver circuit of the plurality of transceiver circuits is configured to:
receive a plurality of antenna signals from a particular antenna unit of the plurality of antenna units;
amplify the plurality of antenna signals to generate a plurality of first buffered signals;
phase shift the plurality of first buffered signals to generate a plurality of first phase-shifted signals;
amplify the plurality of first phase-shifted signals to generate a plurality of second buffered signals;
phase shift the plurality of second buffered signals to generate a plurality of amplified signals, wherein a phase difference between the plurality of amplified signals is based on a type of polarization of the polarized electromagnetic waves; and
combine the plurality of amplified signals to generate a corresponding one of a plurality of output signals; and
a plurality of combiner circuits configured to generate a received signal using corresponding output signals of the plurality of transceiver circuits.

15. The apparatus of claim 14, further comprising:
a plurality of splitter circuits configured to generate a plurality of split signals using a transmit signal; and
a plurality of power amplifier circuits coupled to the plurality of antenna units, wherein a particular power amplifier circuit is configured to:
generate a plurality of drive signals using a particular one of the plurality of split signals, wherein a phase difference between the plurality of drive signals is based on a polarization selected for the transmit signal; and
drive ports of a corresponding antenna unit of the plurality of antenna units using the plurality of drive signals.

16. The apparatus of claim 15, wherein a particular one of the splitter circuits includes a Wilkinson splitter circuit, and wherein a particular one of the plurality of combiner circuits includes a Wilkinson combiner circuit.

17. The apparatus of claim 14, wherein the particular transceiver circuit is configured to:
phase shift the plurality of first buffered signals by a first phase shift; and phase shift the plurality of second buffered signals by a second phase shift different than the first phase shift.

18. The apparatus of claim 17, wherein the first phase shift is 180-degrees, and wherein the second phase shift is 90-degrees.

\* \* \* \* \*

UNITED STATES PATENT AND TRADEMARK OFFICE
CERTIFICATE OF CORRECTION

| | |
|---|---|
| PATENT NO. | : 11,735,833 B2 |
| APPLICATION NO. | : 16/585223 |
| DATED | : August 22, 2023 |
| INVENTOR(S) | : Hongrui Wang et al. |

It is certified that error appears in the above-identified patent and that said Letters Patent is hereby corrected as shown below:

In the Claims

Column 18, Line 52, Claim 3, delete "a wherein" and substitute --wherein--.

Signed and Sealed this
Thirtieth Day of January, 2024

Katherine Kelly Vidal
*Director of the United States Patent and Trademark Office*